United States Patent
Takakura

[11] Patent Number: 5,949,215
[45] Date of Patent: Sep. 7, 1999

[54] SMALL-SIZED BATTERY CHARGER

[75] Inventor: Akira Takakura, Chiba, Japan

[73] Assignee: Seiko Instruments Inc., Japan

[21] Appl. No.: 09/117,224

[22] PCT Filed: Jan. 17, 1997

[86] PCT No.: PCT/JP97/00120

§ 371 Date: Oct. 26, 1998

§ 102(e) Date: Oct. 26, 1998

[87] PCT Pub. No.: WO97/27640

PCT Pub. Date: Jul. 31, 1997

[30] Foreign Application Priority Data

| Jan. 25, 1996 | [JP] | Japan | 8-011250 |
| Apr. 9, 1996 | [JP] | Japan | 8-086899 |
| Oct. 4, 1996 | [JP] | Japan | 8-264630 |

[51] Int. Cl.$^6$ .................................................. H02J 7/00
[52] U.S. Cl. ........................ 320/114; 320/107; 322/1
[58] Field of Search .......................... 320/107, 137, 320/114; 322/1, 3; 290/1 R, 1 E, 4

[56] References Cited

U.S. PATENT DOCUMENTS

| 3,573,479 | 4/1971 | Rieth | 290/1 E |
| 4,008,566 | 2/1977 | McClintock | 368/64 |
| 4,871,042 | 10/1989 | Hsu et al. | 180/220 |
| 4,939,707 | 7/1990 | Nagao | 368/64 |
| 5,358,461 | 10/1994 | Bailey, Jr. | 482/2 |
| 5,630,155 | 5/1997 | Karaki et al. | 395/800 |
| 5,644,207 | 7/1997 | Lew et al. | 320/101 |

FOREIGN PATENT DOCUMENTS

| 2-35547 | 8/1990 | Japan . |
| 4-67736 | 3/1992 | Japan . |
| 6-68911 | 3/1994 | Japan . |

*Primary Examiner*—Peter S. Wong
*Assistant Examiner*—Gregory J. Toatley, Jr.
*Attorney, Agent, or Firm*—Adams & Wilks

[57] ABSTRACT

An efficient battery charger which does not require rectifiers such as diodes, and prevents the reverse charging of a secondary battery and discharge to a generator from the secondary battery in an electrical close loop constituted of the generator and secondary battery by using a mechanical mechanism. The battery charger comprises an external rotary operating member (1), a generator (5) which converts the rotational kinetic energy of the member (1) into electrical energy, a one-way rotary clutch (20) which short-circuits an energy path for transmitting the rotational kinetic energy of the member (1) to the generator, an electricity storage (6) which stores the converted electrical energy, and an electrical switch (30) which forms an electrical loop by connecting the generator (5) to the storage (6) when the generator (5) is in a generating state.

5 Claims, 27 Drawing Sheets

FIG.9(a)
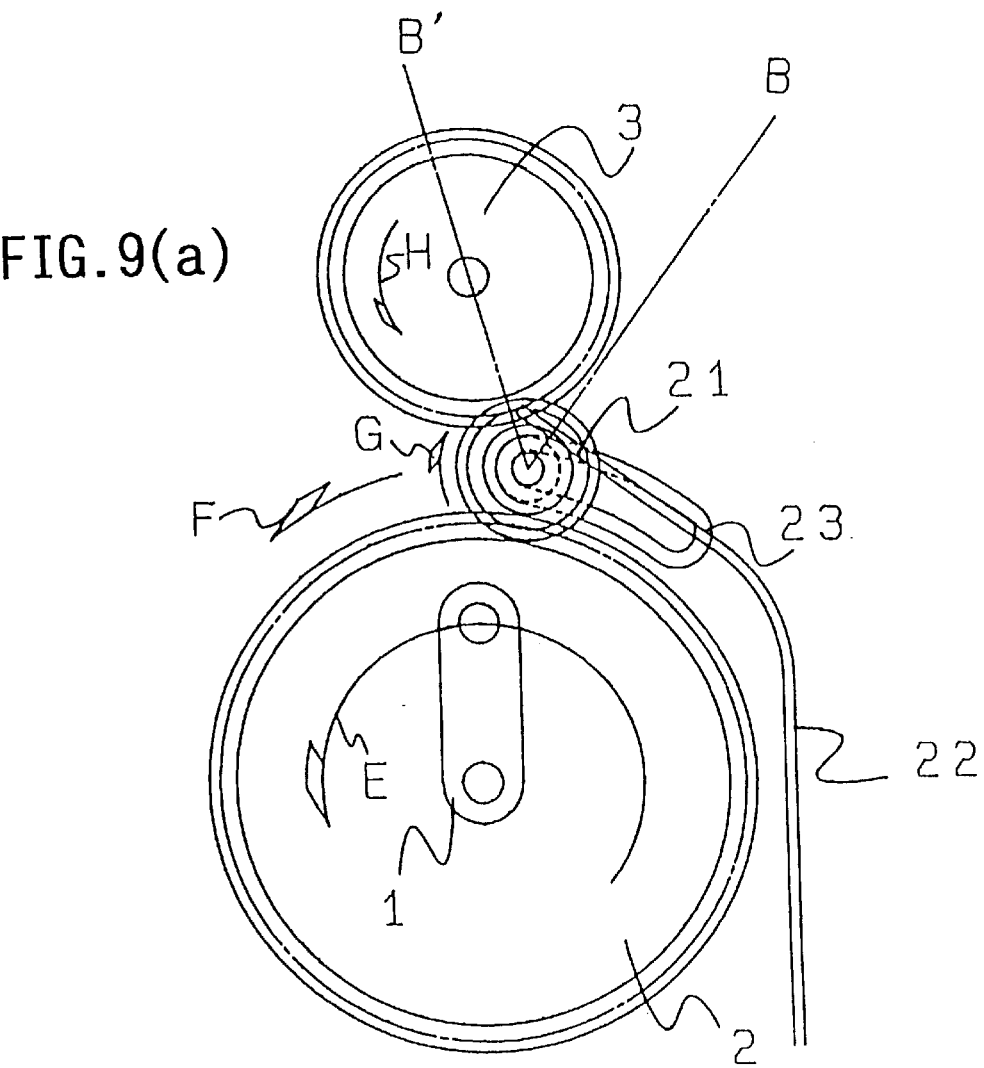
FIG.9(b)   B-B' SECTION
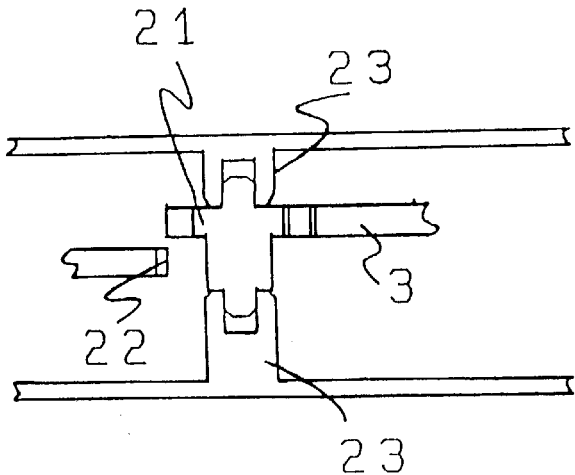

FIG.10(a)
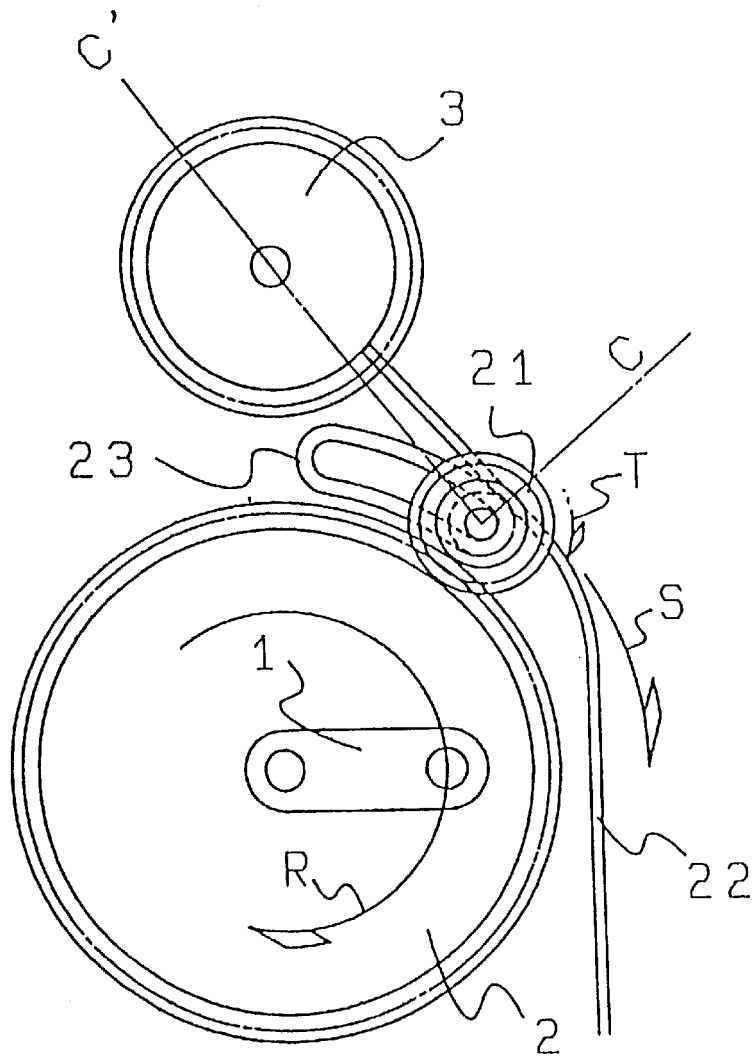
FIG.10(b)  C-C' SECTION
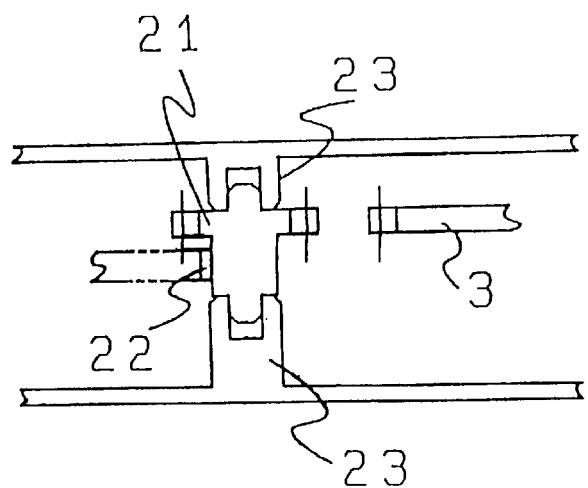

FIG. 23 (a)
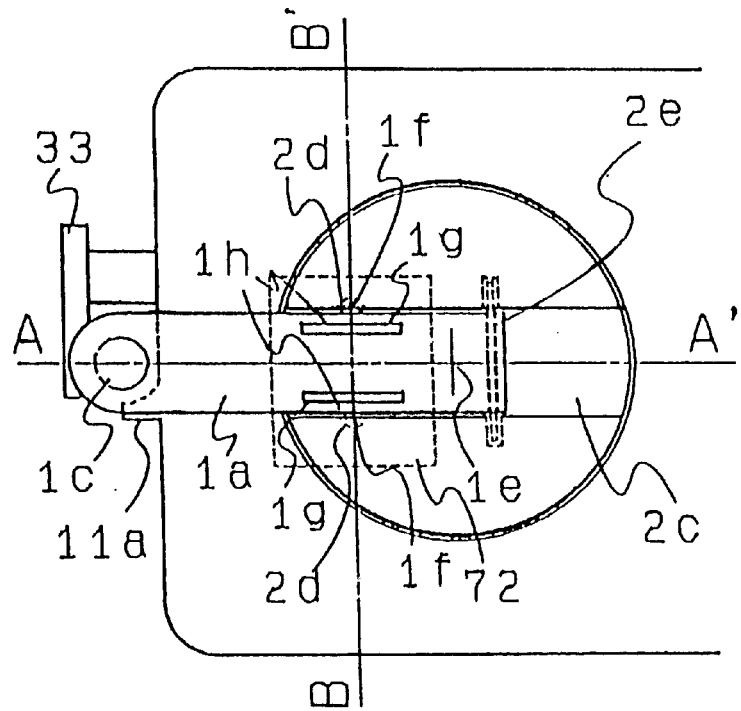
FIG. 23 (b) A-A' SECTION
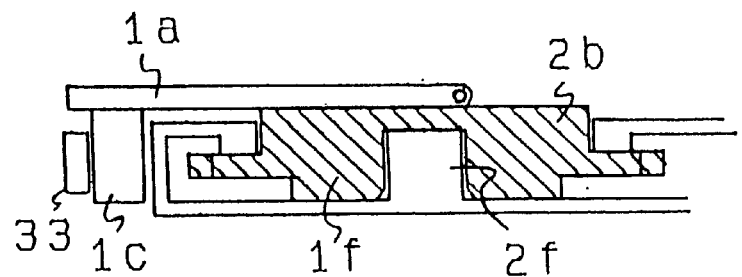
FIG. 23 (c) B-B' SECTION
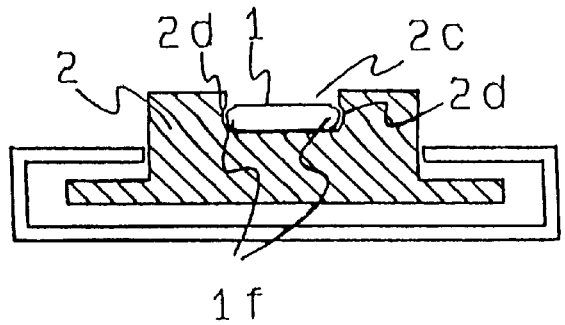

SMALL-SIZED BATTERY CHARGER

TECHNICAL FIELD

This invention relates to a small-sized battery charger structured by an external rotary operating member such as a handle arranged for rotation, a generator to convert a rotational kinetic energy of the external rotary operating member into an electrical energy that is non-invertable in electric polarity depending on the rotation, a one-way rotary clutch to automatically control whether or not to transmit the rotational kinetic energy of the external rotary operating member to the generator, an electricity storing means such as a secondary battery to store the converted electrical energy, and an electrical connecting/disconnecting means to form an electrical loop by connecting between the generator and the electricity storing means when the generator is in a power generating state.

BACKGROUND ART

Conventionally, there is known a small-sized battery charger having, as shown in FIG. 3, a handle 1 arranged for rotation, a rotation transmitting wheel 2 to rotate in synchronism with the handle 1, an intermediate wheel 3 and a power-generating gear 4 to transmit the rotation of the rotation transmitting wheel 2, a generator 5 to convert the rotational energy of the power-generating gear 4 into an electrical energy that is non-invertable in electric polarity depending on the rotation, and wherein the generator has one output connection OUT1 electrically connected to a positive side of an electricity storing means 6 (e.g. a secondary battery or a capacitor) through a conductive material 10a and a plus connection 8 and another output connection OUT2 electrically connected to a negative side of an electricity storing means 6 through a conductive material 10b, an electrical rectifying element (e.g. a diode) and a minus connection 7, so that a rotational kinetic energy applied to the handle 1 is converted into an electrical energy and stored in the electricity storing means 6.

Incidentally, the generator 5, if rotated at a constant rotational speed in a positive direction, has a terminal voltage with a characteristic increased in potential at a plus side relative to GND as shown in a solid line "a" in FIG. 4. If rotated at a constant rotational speed in a reverse direction, the characteristic has a potential decreased at a minus side relative to GND as shown in a solid line "b" in FIG. 4.

This conventional small-sized battery charger has an electrical circuit configuration as shown in FIGS. 5(a) and (b). Explanations will be made on the principle of electricity charging based on an operational flowchart shown in FIG. 6.

First, if the handle 1 is rotated leftward as shown in FIG. 5(a), the rotation of the rotation transmitting wheel 2 is transmitted through the intermediate wheel 3 to the power-generating gear 4 to develop an electromotive voltage E between respective output connections of the generator 5. When the electromotive voltage E of the generator 5 and the potential of the secondary battery have a relationship "E>Vc", an electric current i1 flows through an electrical loop structured by the generator 5, a diode 12 and the secondary battery 6. An electrical energy is stored in the secondary battery 6.

On the other hand, if the handle 1 is rotated rightward as shown in FIG. 5(b), the rotation is transmitted as stated above to develop an electromotive voltage −E between the respective output connections of the generator 5. At this time, E and vc are in a relationship "−E<Vc", so that no electric current i flows through the electrical loop due to the electric characteristic of the diode 12.

Incidentally, when the handle is at a standstill, the potential difference between the respective ends of the generator is at "0" and accordingly no current i flows through the electrical loop similarly to the case of the rightward rotation of the handle 1.

By providing the diode 12 in the electrical loop formed by the generator 5 and the secondary battery 6, prevention is made against reverse charging from the generator 5 to the secondary battery 6 as well as discharging from the secondary battery 6 to the generator 5.

In the small-sized generator to perform electric rectification using an electric element such as a diode, etc. as shown in the conventional example, however, if a current flows through the diode 12 in a forward direction as shown in FIG. 5(a), the electric power Wc that can be charged to the secondary battery becomes as Wc=(E−Vf)*i1. As a result, the diode 12 has an electric loss Vf*i1 occurring therein. Since the battery charger circuit has a flowing current of several hundreds mA, the forward voltage Vf becomes 0.5 V or higher when the forward current if (if=i1) exceeds 100 mA.

There is usually a necessity of "1.2 V or higher" to charge a nickel-based secondary battery, and of "3 V or higher" for a lithium-based secondary battery. Consequently, there has been a problem that, if the forward voltage vf lost by the above-state diode 12 becomes 0.5 V or higher, "the energy loss by the diode 12 with respect to the total loss amounts to approximately 30% for a nickel-based secondary battery case", and "the energy loss by the diode 12 with respect to the total loss amounts to approximately 15% for a lithium-based secondary battery case", thus lowering the charging performance corresponding to the loss by the diode.

Therefore, it is the object of this invention to obtain, in order to solve the conventionally encountered problem as stated above, an efficient battery charger which employs a mechanical mechanism to prevent, in an electrical loop formed by a generator 5 and a secondary battery 6, against reverse charging from the generator to the secondary battery 6 as well as discharging from the secondary battery 6 to the generator 5.

Also, there has been a problem that, when the generator is not in a power generating state with a handle 1 accommodated in a predetermined position, the charging button 33 is erroneously depressed to cause discharge from the secondary battery 6 to the generator.

DISCLOSURE OF THE INVENTION

In order to solve the above-stated problem, this invention is characterized, as shown in FIG. 1, by comprising, as a means to prevent against reverse charging from a generator 5 to a secondary battery 6 in a electrical loop structured by the generator 5 and the secondary battery, a one-way rotary clutch 20 formed by a rotation transmitting wheel 2, a rocking wheel 21 always in mesh with the rotation transmitting wheel 2, and an intermediate wheel 3.

Also, a means for preventing against discharge from the secondary battery to the generator 5 is characterized by providing a switch contact spring 31 having a fixed portion and formed by an elastic member in electrical contact with one output connection of the generator 5 through a conductive material 10a, at least one connection 7 of two connections in electrical connection with the secondary battery 6, and an electrical connecting/disconnecting means 30 formed by the external operating member 33.

Further, it is characterized that there are provided a mechanical engaging means to be engaged at a part of a handle with a charging button and position, in plan, the handle in a reversed state in position by a part of the case, and a holding means to prevent the handle mechanically or magnetically reversed, thereby preventing the electrical connecting/disconnecting means from being erroneously operated such as by depressing the charging button during not in charging to cause discharge from the second battery to the generator.

Also, it is characterized that a space is provided in the case to accommodate the handle so that a part of the handle is abutted against a part of the electrical connecting/disconnecting means to place the electrical connecting/disconnecting means in an electrically open state, thereby preventing against erroneous operation such as discharge from the secondary battery to the generator.

In the small-sized battery charger constructed as above, the one-way rotary clutch 20 operates, in one rotational direction, to place the rotation transmitting wheel 2, the rocking wheel 21 and the intermediate wheel 3 in normal mesh therebetween to enable the generator 5 to rotate through a power-generating gear 4, and, in the other rotational direction, to disengage the rocking wheel 21 from the intermediate wheel 3 to disable a generator axis 5a to rotate, whereby an electrical energy induced by the generator 5 can be stored always in a same polarity into the electricity storing means 6 to prevent against reverse charging from the generator 5 to the secondary battery 6 in an electrically closed loop formed by the generator 5 and the secondary battery 6.

Also, the electrical connecting/disconnecting means 30, when the generator 5 is in a power generating state, causes the external operating member 33 to press against a spring arm portion of the switch contact spring 31 so that a switch contact spring member at its end portion is abutted against the connection 7 to obtain an electrical connection. This causes the external operating member 33 to switch over ON/OFF the electrical connection of the electrically closed loop structured by the generator 5 and the secondary battery 6, thereby preventing against discharge from the secondary battery 6 to the generator 5.

The mechanically engaging means of the present invention shown in FIG. 18 is structured by a handle positioning guide portion provided at a part of the case, a structure for accommodating a convex portion provided at a part of the handle, and a structure for abutting a part of the handle against a part of the charging button to engage with the moving charging button.

Further, the holding means may be anything provided that it can prevent the external operating member from rising up when the external operating member in an inverted position is engaged at a part thereof. However, the followings are preferred as the holding means to prevent the handle from rising up:

(A) a means, for preventing the handle from rising up, having a magnetic pin fixed (fixing is by driving in or adhesion) to the handle and a magnetic-material flanged pin having a magnetized magnet joined(e.g. by adhesion) to one surface thereof and driven in the case to utilize a magnetic attractive force acting between these pins; or (B) a means, for preventing the handle from rising up, having a convex portion provided at a side face of the handle, and a concave portion in the rotation transmitting wheel to place the handle engaged at a predetermined position by these convex and concave portions.

The electrically connecting/disconnecting means 80 of the present invention as shown in FIG. 26 has an external operating member accommodating portion 11b provided at a part of the case, and an electrical connecting/disconnecting means formed by a spring portion to electrically connect and disconnect the electrical loop between the generator and the electricity storing means and an electrical contact member, so that the external operating member is accommodated in the accommodating portion. This makes it possible to abut the external operating member against the spring portion of the electrical connecting/disconnecting means, and shield, in electrical connection, the spring portion from the electrical contact member, thereby also preventing against discharge from the secondary battery 6 to the generator 5 during not in charging.

BRIEF DESCRIPTION OF THE DRAWINGS

FIG. 9 is a view concerning the operation of a one-way rotary clutch during leftward rotation of the handle in Embodiment 1 of the present invention, wherein (a) shows a sectional view and (b) shows a section on line B–B' in (a);

FIG. 10 is a view concerning the operation of the one-way rotary clutch during rightward rotation of the handle in Embodiment 1 of the present invention, wherein (a) shows a sectional view and (b) shows a section on line C–C' in (a);

FIG. 23 is a view showing a state that the handle 1 is reversed to engage a grip 1c with a charging button 33, wherein (a) is a plan view, (b) is a sectional view on line A–A' in (a), and (c) is a sectional view on line B–B';

BEST FORM FOR PRACTICING THE INVENTION

The invention will be explained hereinbelow according to embodiments with reference to the drawings.

Embodiment 1

Figure 1:
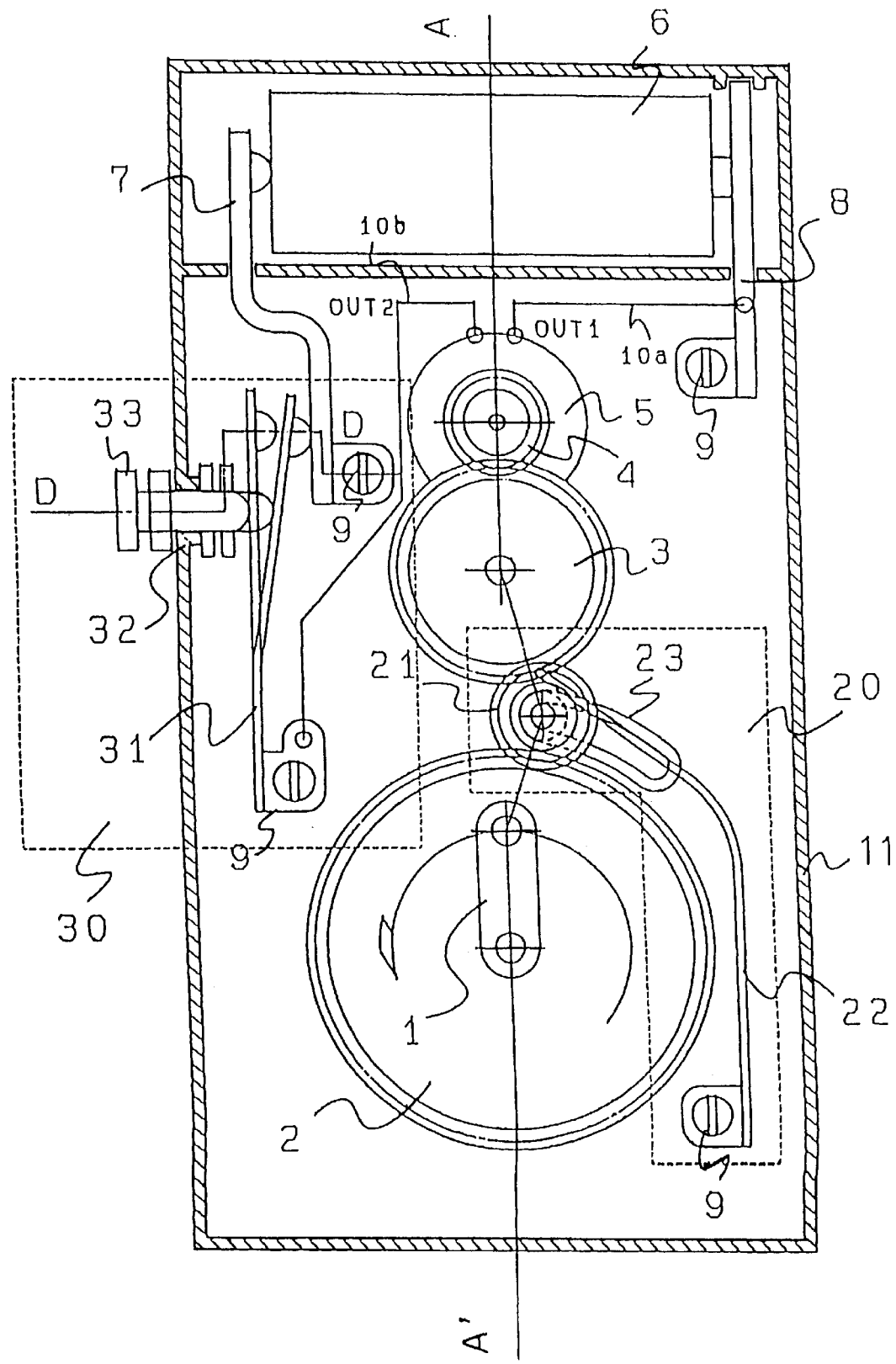
FIG. 1 is a plan view showing a small-sized battery charger in Embodiment 1 of the present invention.
Figure 2:
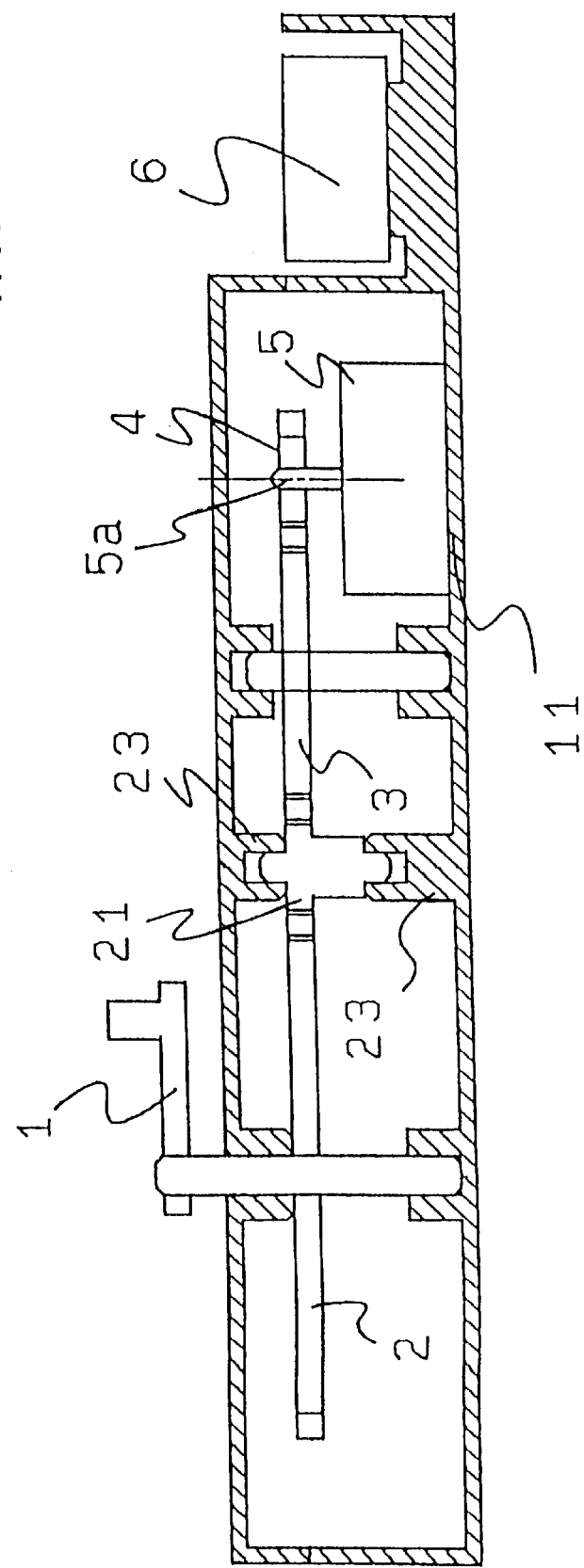
FIG. 2 is a sectional view showing a section on line A–A' in FIG. 1.
Figure 3:
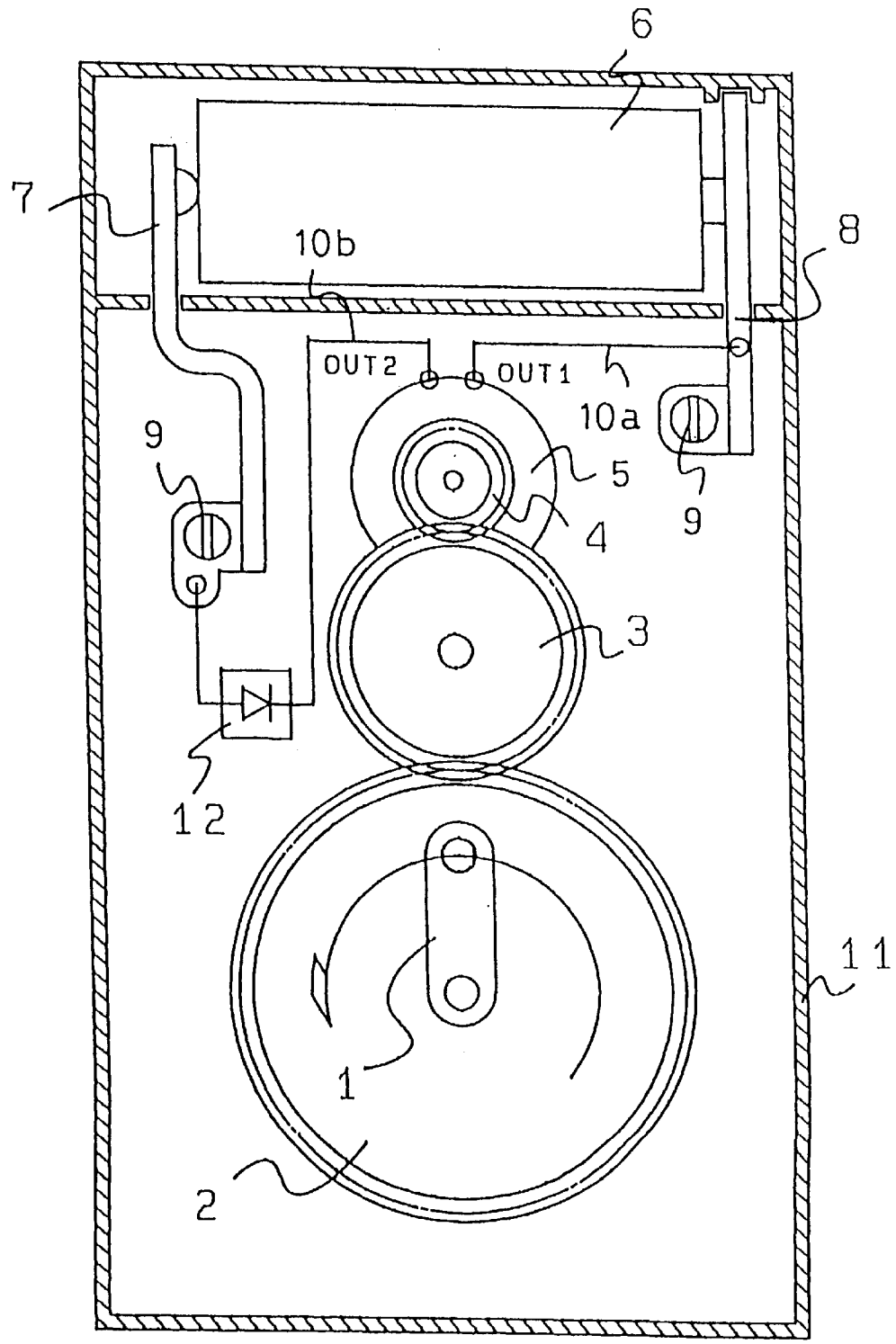
FIG. 3 is a plan view of a conventional small-sized battery charger.
Figure 4:
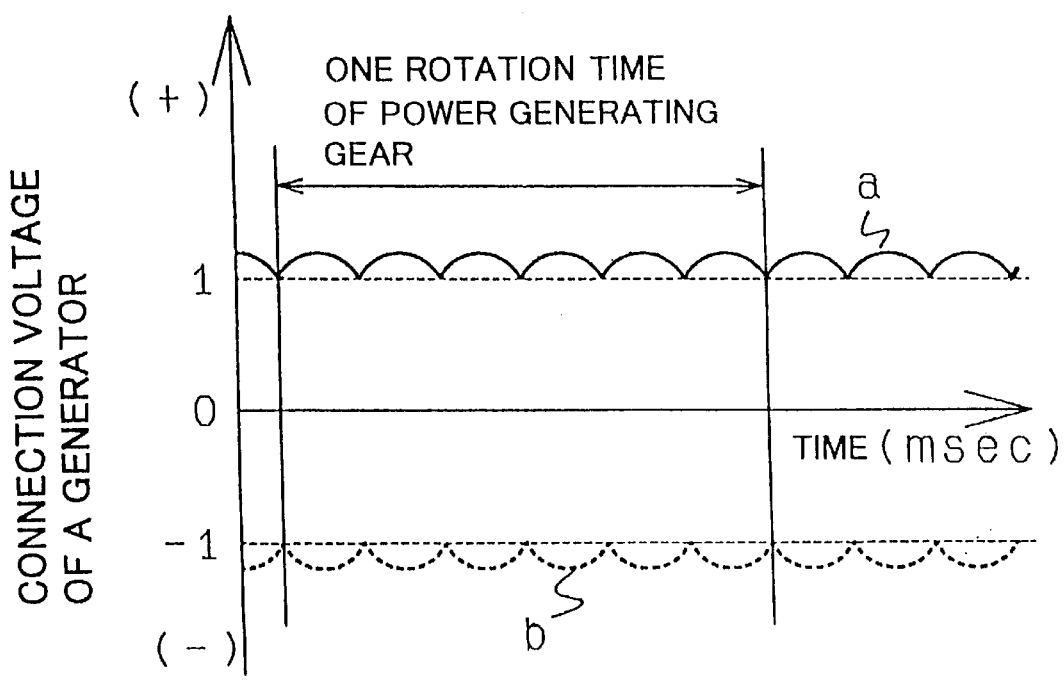
FIG. 4 is a graph showing connection voltage of a generator when a power-generating gear is rotated at a constant speed in a forward or reverse direction.
Figure 5A:
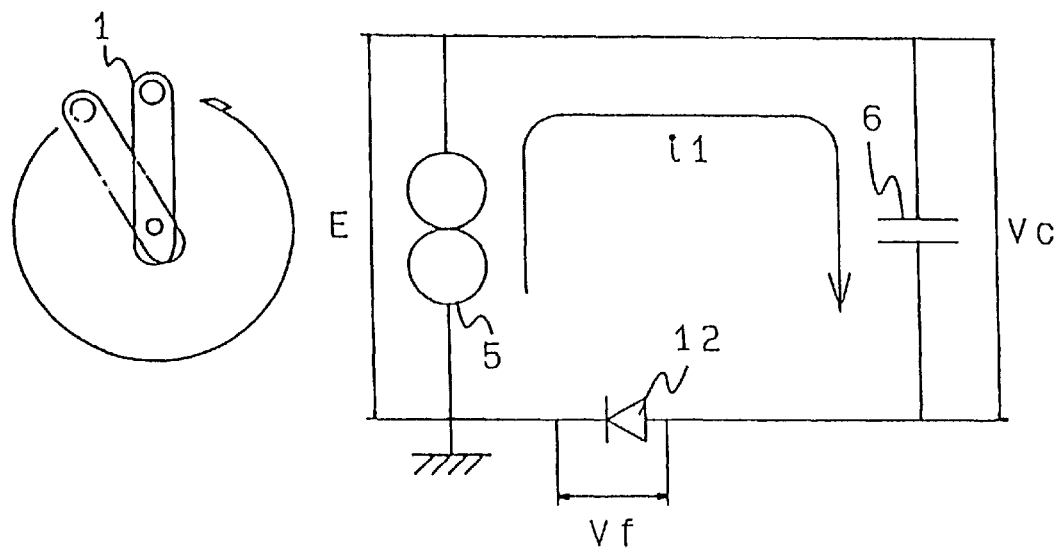
FIG. 5 is an electrical circuit of the conventional small-sized battery charger, wherein a current flow is shown when (a) a handle is rotated leftward and (b) the handle is rotated rightward.
Figure 5B:
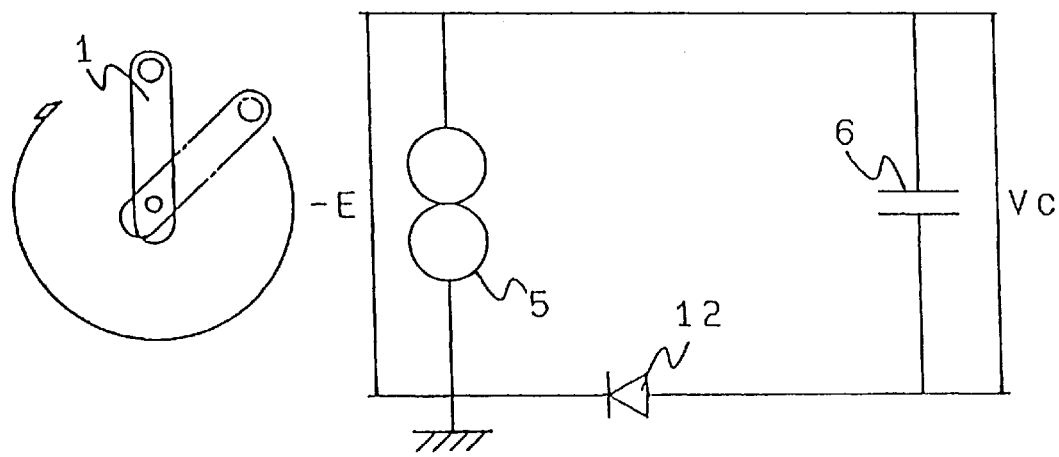
Figure 6:
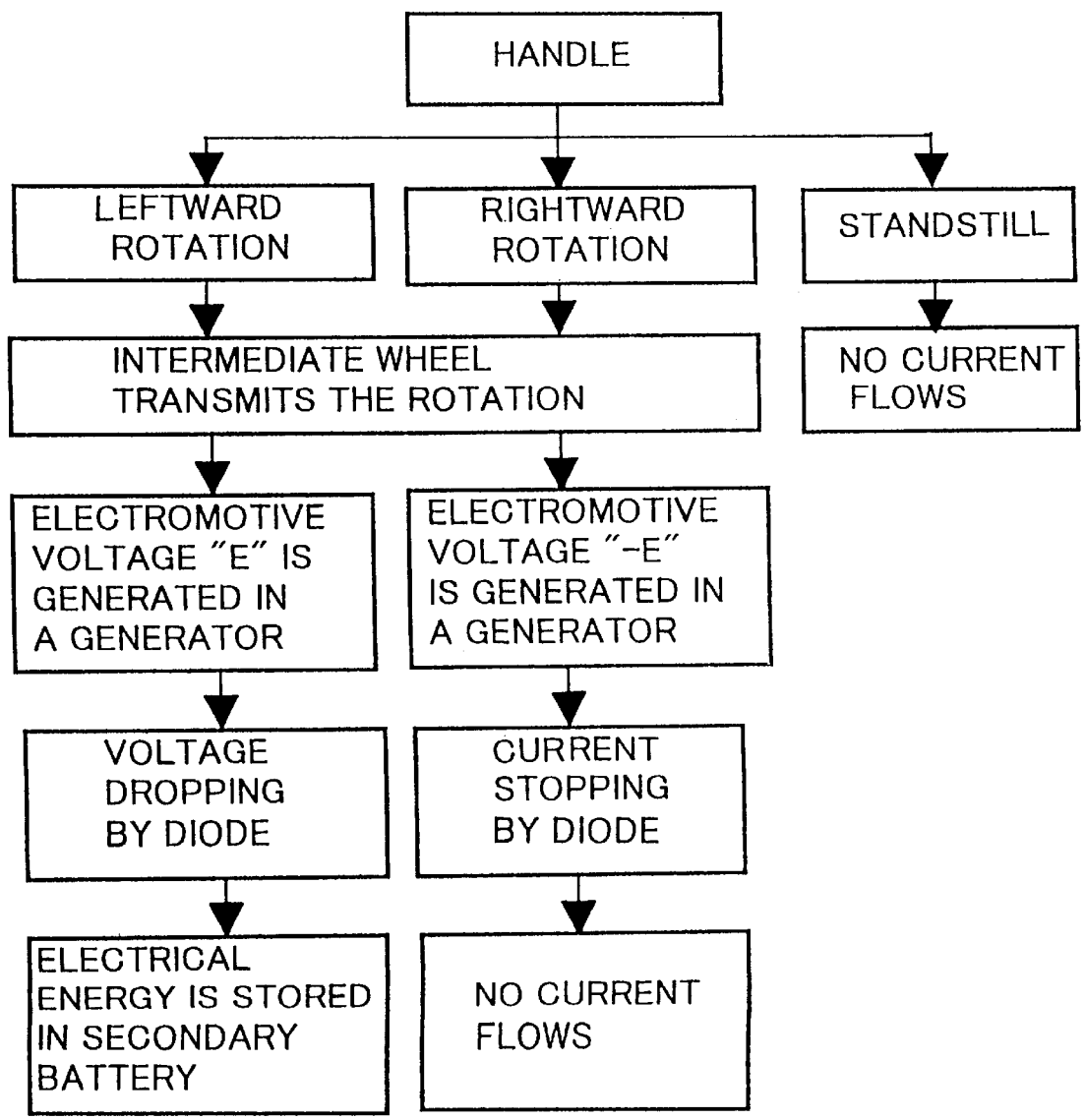
FIG. 6 is a operational flowchart of the conventional small-sized battery charger.
Figure 7:
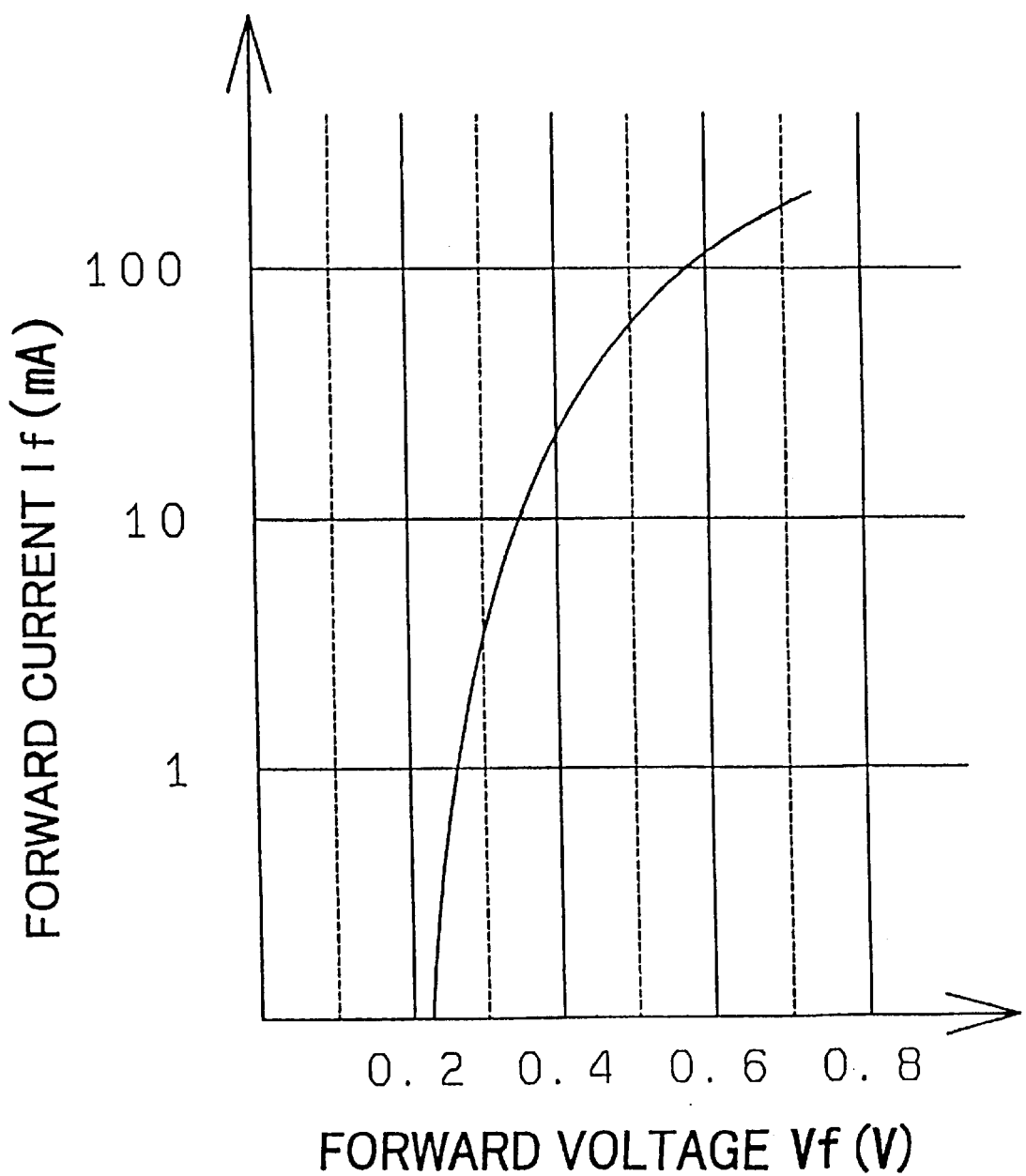
FIG. 7 is a graph showing an electrical characteristic of a diode.

FIG. 1 is an explanatory view illustrating one embodiment of a small-sized battery charger of the present invention, while FIG. 2 is a sectional view taken on a line A–A' shown in FIG. 1.

The small-sized battery charger of this invention has an exterior case 11 that includes basic structural elements required for this inventive small-sized battery charger.

First, a kinetic-energy transmitting path is constituted by a rotatable handle 1, a rotation transmitting wheel 2 that rotates in synchronism with the handle 1, a rocking wheel 21 in mesh with the rotation transmitting wheel 2 at all times, a intermediate wheel 3 that transmits the rotation of the rocking wheel 21, and a power-generating gear 4.

Further, a one-way rotary clutch 20 is structured by a rocking wheel guide grooves 23 provided at upper and lower of the case 11 so that the rotation transmitting wheel 2 and the rocking wheel 21 are always in mesh with. A rocking-wheel lateral pressure spring 22 is provided to apply a lateral load onto the rocking wheel 21.

Then, the rotational energy transmitted to the power-generating gear 4 is converted by a generator into an electrical energy that is non-invertable in electric polarity.

The electrical energy converted by the generator 5 is charged to a secondary battery 6 through the electrical energy transmitting path.

The electrical energy transmitting path has a positive polarity path connecting between an output connection OUT 1 of the generator 5 and a positive pole of the secondary battery 6 through a conductive material 10a and an electrically-positive connection 8. A negative path, on the other hand, connects an output connection OUT 2 of the generator 2 to a switch contact spring 31 through a conductive material 10b so that it is electrically connected to a negative pole side of the secondary battery 6 through a minus connection 7.

Also, to displace the switch contact spring 33, there are provided are a switch 33 and a switch guide hole 32 to smoothen movement of the switch.

Further, screws 9 are provided in order to fix the plus connection 8, the switch contact spring 31, the minus connection 7, and the rocking-arm lateral pressure spring 22. Although these screws are explicitly shown to clarify a fixing structure, the screws are unnecessary if such fixing is available by other methods.

Now, explanations will be made for an electrical connecting/disconnecting means 30 and the one-way rotary clutch 20 based on the one embodiment.

First, the electrical connecting means 30 will be explained using FIG. 8(a) and FIG. 8(b) as sectional views illustrating sections of FIG. 1 and a section D—D in FIG. 1.

The electrical connecting means 30 is structured by the switch contact spring 31, the minus connection 7 and the switch 33.

The switch contact spring 31 is provided, at its one end, with a fixing portion electrically connected to the output connection OUT 2 and formed of an electrically conductive resilient member.

Figure 8A:
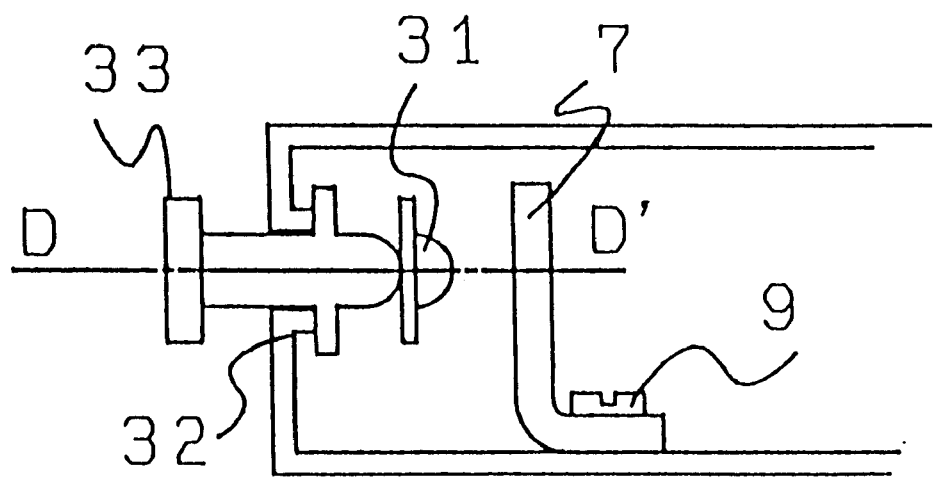
FIG. 8 is a sectional view showing a section on line D–D' in FIG. 1 concerning an electrical connecting/disconnecting means in Embodiment 1 of the present invention.

As shown in FIG. 8(a), when no external load is applied, the switch contact spring 31 and the minus connection 7 are in distant so that the generator and the secondary battery 6 are placed in an electrically open state.

Figure 8B:
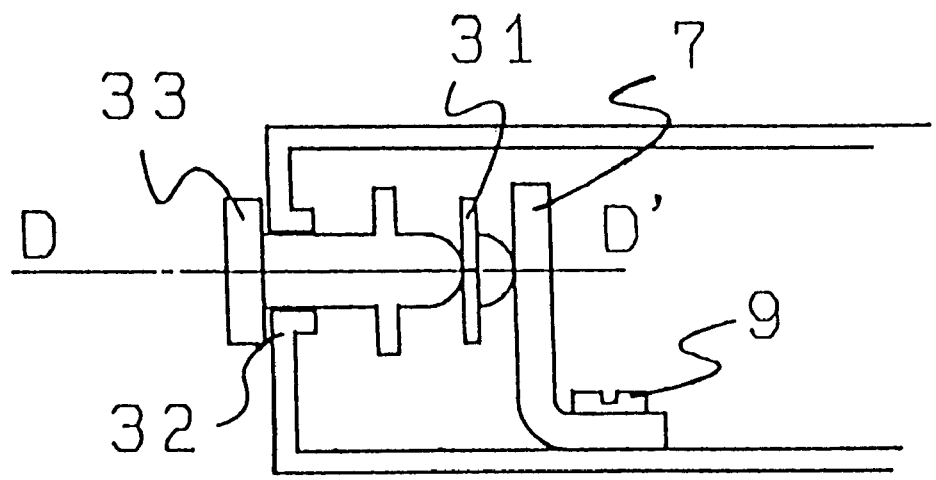

On the other hand, when the switch 33 is applied by a depressing force to press against an arm portion of the switch contact spring as shown in FIG. 8(b), the switch contact spring member at its end is brought into abutment against the minus connection 7, thus providing an electrical contact. The secondary battery 6 and the generator 5 are in an electrically connected state, enabling the generator 5 to charge electrical energy to the secondary battery 6.

Now, the one-way clutch 20 will be explained using FIG. 9 and FIG. 10. The one-way clutch 20 is structured by the rocking wheel 21 always in mesh with the rotation transmitting wheel 2, the rocking-wheel guide grooves 23 provided at the upper and lower of the case 11 to always retain engagement between the rotation transmitting wheel 2 and the rocking wheel 21, and the rocking-wheel lateral pressure spring 22.

The one-way clutch 20 operates on a principle as shown in FIG. 9(a). When the handle 1 is rotated leftward (an allow E in FIG. 9), the rocking wheel 21 being in mesh with the rotation transmitting wheel 2 moves in a direction of an arrow F along the rocking-wheel guide groove 23. The rocking wheel 21 in turns rotates in a direction of an arrow G so that the intermediate wheel 3 in mesh with the rocking wheel 21 is rotated in a direction of an arrow H.

Note that, in the above state, the rotation transmitting wheel 2, the rocking wheel 21 and the intermediate wheel 3 remain in mesh with because the rocking wheel 21 is acted upon by a force in the direction of the arrow F. Meanwhile, since the rocking-wheel lateral pressure spring 22 and the rocking wheel 21 are out of contact as also shown in a B–B' sectional view, the rocking wheel 21 has no lateral load applied thereto.

Meanwhile, if the handle 1 is rotated rightward (an arrow R in FIG. 10) as shown in FIG. 10(a), the rocking wheel 21 in mesh with the rotation transmitting wheel 2 is acted upon by a force in a direction of an arrow S so that it moves in the direction of the arrow S along the rocking-wheel guide groove 23. Thus, the rocking wheel 21 and the intermediate wheel 3 are brought out of contact. Accordingly the intermediate wheel 3 is not in rotation.

Incidentally, in this state the rocking-wheel lateral pressure spring 22 and the rocking wheel 21 are in contact with each other, as shown in a sectional view taken on line C–C' in FIG. 10(b). Due to this, the rocking wheel 21 is applied by a lateral load and prohibited from rotating, thereby revolving round the rotation transmitting wheel 2. The rocking wheel 21 moves toward one end of the rocking-wheel guide groove 23 and then begins to rotate (as shown by an arrow T in FIG. 10(a)). Consequently, the rocking wheel 21 and the intermediate wheel 3 remain out of mesh while the handle 1 is being rightwardly turned.

The one-way rotary clutch 20 operates on the principle as explained as above.

Now, explanations will be made on the one-way rotary clutch 20 characterized by the present invention and the electrical connecting/disconnecting means 30 based on an electrical circuit diagrams in FIG. 11(a) and FIG. 11(b).

Figure 11A:
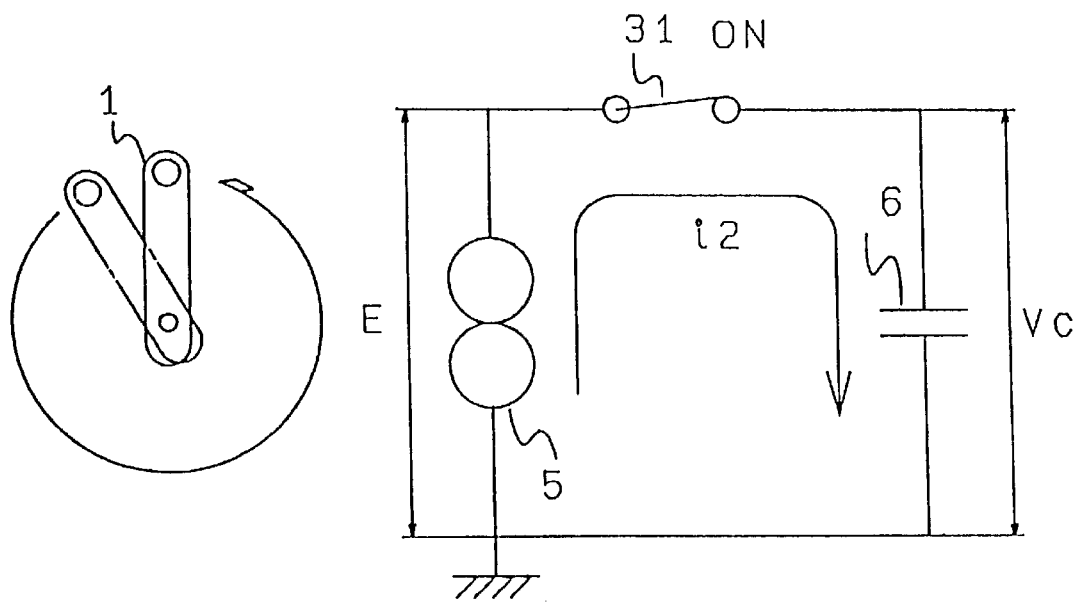
FIG. 11 is an electrical circuit diagram in Embodiment 1 of the present invention, wherein explanatory views are shown by (a) when the handle is rotated leftward and (b) when the handle is rotated rightward.

When the handle 1 is rotated leftward, an electromotive voltage E is generated in a generator 5, as shown in FIG. 11(a). At this time, if the electrical connecting/disconnecting means 30 is turned "ON (in a state of depressing a switch 33)", an electric current i1 flows through the electrical circuit so that a secondary battery 6 is raised in potential to Vc and charged with electricity.

Figure 11B:
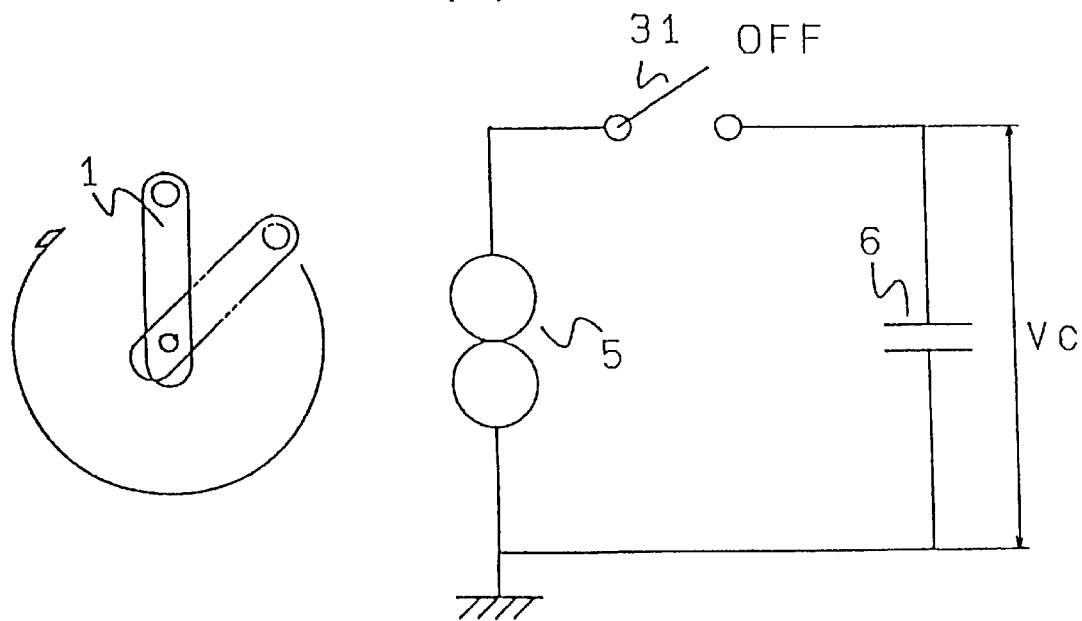

On the other hand, when the handle 1 is rotated rightward, no electromotive voltage E is generated in the generator 5, as shown in FIG. 11(b). Due to this, no reverse current is generated to thereby avoid the secondary battery 6 from being reversely charged.

Also, if the electrical connecting/disconnecting means 30 is kept "OFF (switch 33 not depressed)", no electric current flows through the electrical circuit to thereby avoid the electric power stored on the secondary battery 6 from being discharged to the generator.

In this manner, the provision of the one-way rotary clutch 20 and the electrical connecting/disconnecting means 30 within the battery charger makes it possible to provide electrical rectification as was obtained in a diode 12 used in the conventional battery charger.

The above are explanations on Embodiment 1.

Embodiment 2

Figure 12:
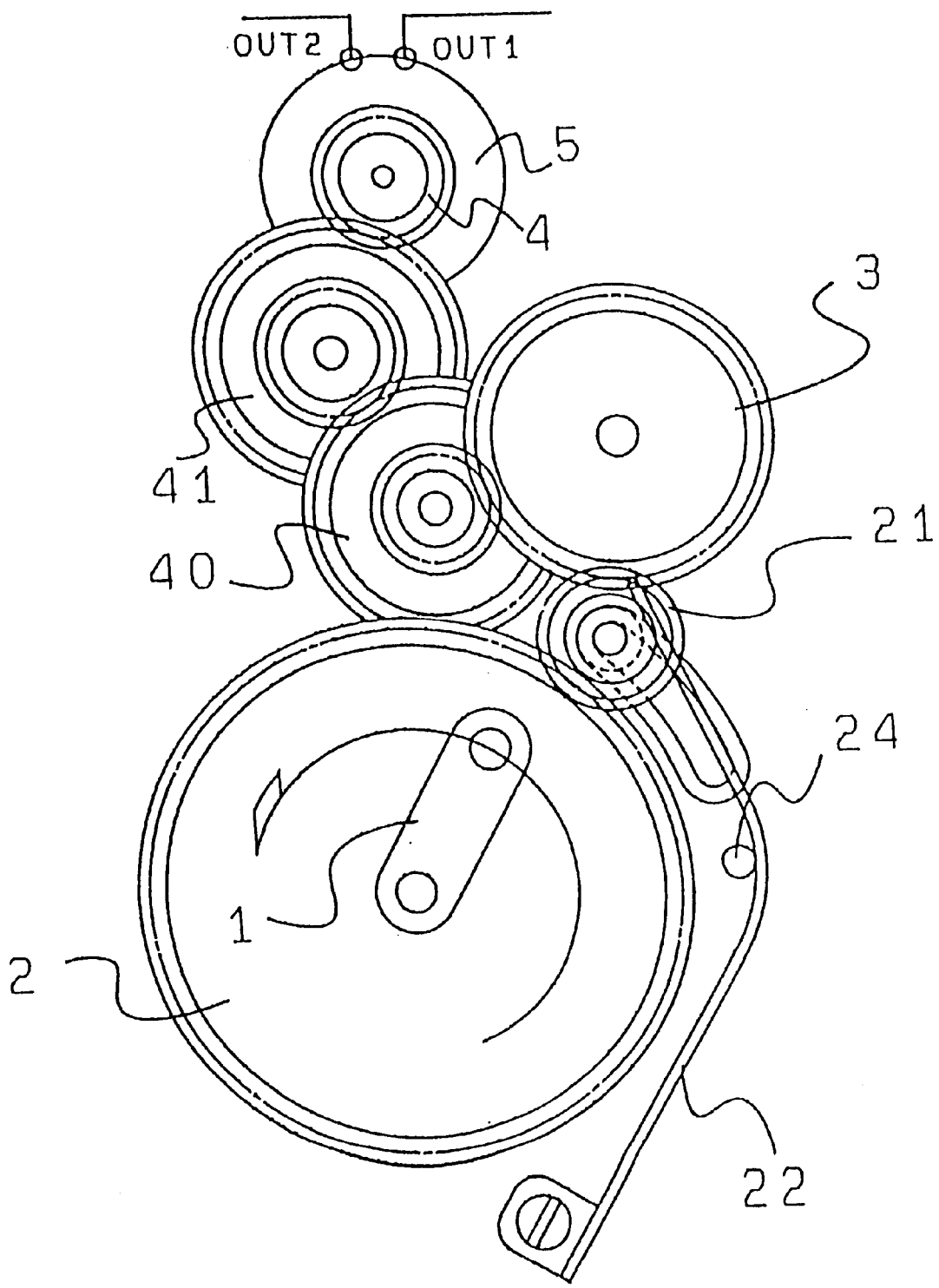
FIG. 12 is a plan view of a wheel train structure in Embodiment 2 of the present invention.

Embodiment 2 is on another example concerned with the kinetic-energy transmitting path in the small-sized battery charger of the present invention, wherein a plan view is shown in FIG. 12 illustrating a structure of a wheel train.

Between the intermediate wheel 3 and the power-generating gear 4 are provided speed-increasing wheels 40, 41 in order to increase the speed-increasing ratio given from the handle 1 to the power-generating gear 4.

The provision of the speed-increasing wheels in the kinetic-energy transmitting path is to rotate the power-generating gear 4 at high speeds. In particular, this serves as an effective means for a case employing a generator having an electromotive voltage dependent upon the rotational speed. The power-generating gear 4 is allowed to rotate at high speeds to thereby maintain a predetermined generated power voltage, without requiring increase in rotational speed of the handle 1. It is noted that there is a necessity of design taking into consideration the gear strength for the speed increasing wheels because the rotational torque is increased by the use of the speed increasing wheels.

Also, the one-way rotary clutch 20 is provided with a guide pin 24 for the rocking-wheel lateral pressure spring in order to prevent the rocking-wheel lateral pressure spring 22 from chattering at its free end. The rocking-wheel lateral pressure spring 22 and the rocking wheel 21 are kept at a certain constant distance while they are out of contact.

Embodiment 3

Embodiment 3 is on another example concerned with the electrical connecting/disconnecting means in the small-sized battery charger of the present invention.

Figure 13:
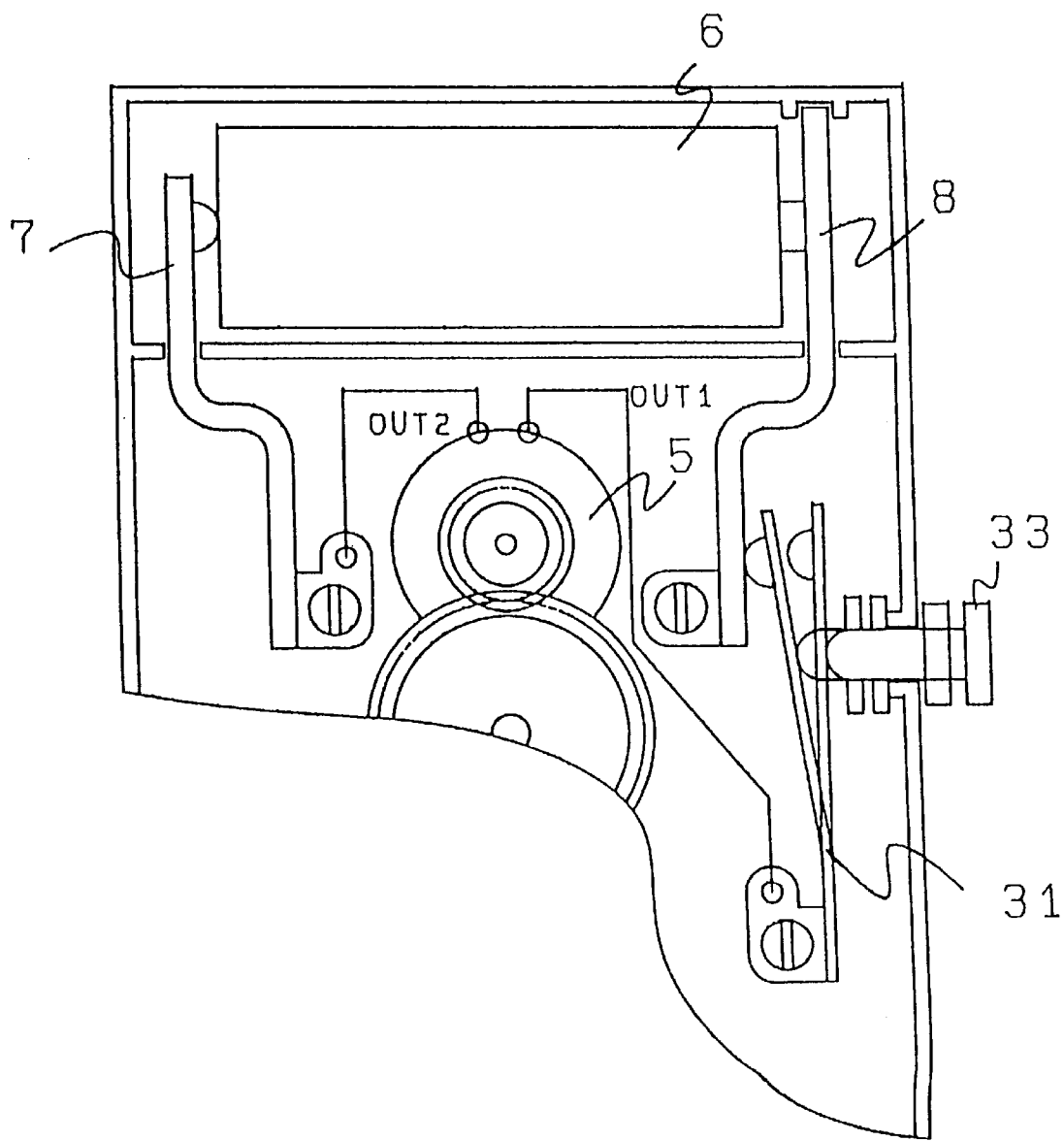
FIG. 13 is an explanatory view concerning an electrical connecting/disconnecting means in Embodiment 2 of the present invention.

The generator 5 and the secondary battery 6 are connected to each other by allowing electrical connection between a switch contact spring 31 and a plus connection 8, as shown in FIG. 13.

Embodiment 4

Embodiment 4 is on another example concerned with the electrical connecting/disconnecting means in the small-sized battery charger of the present invention.

Figure 14:
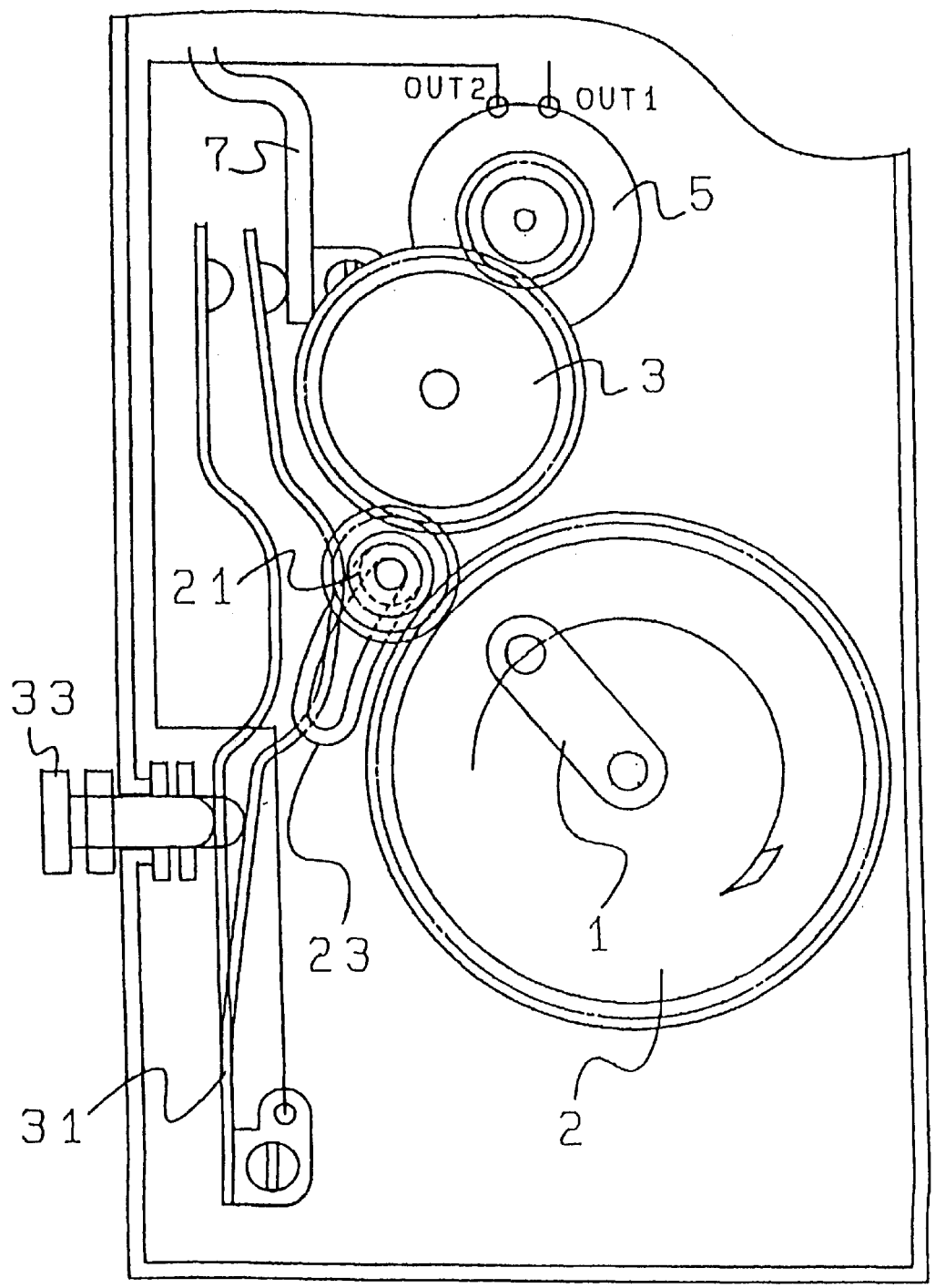
FIG. 14 is an operational view concerning an electrical connecting/disconnecting means during rightward rotation of the handle in Embodiment 4 of the present invention.

FIG. 14 is an operational view concerned with the electrical connecting/disconnecting means, showing a state of charging the secondary battery from the generator 5 by rotating the handle rightward.

Figure 15:
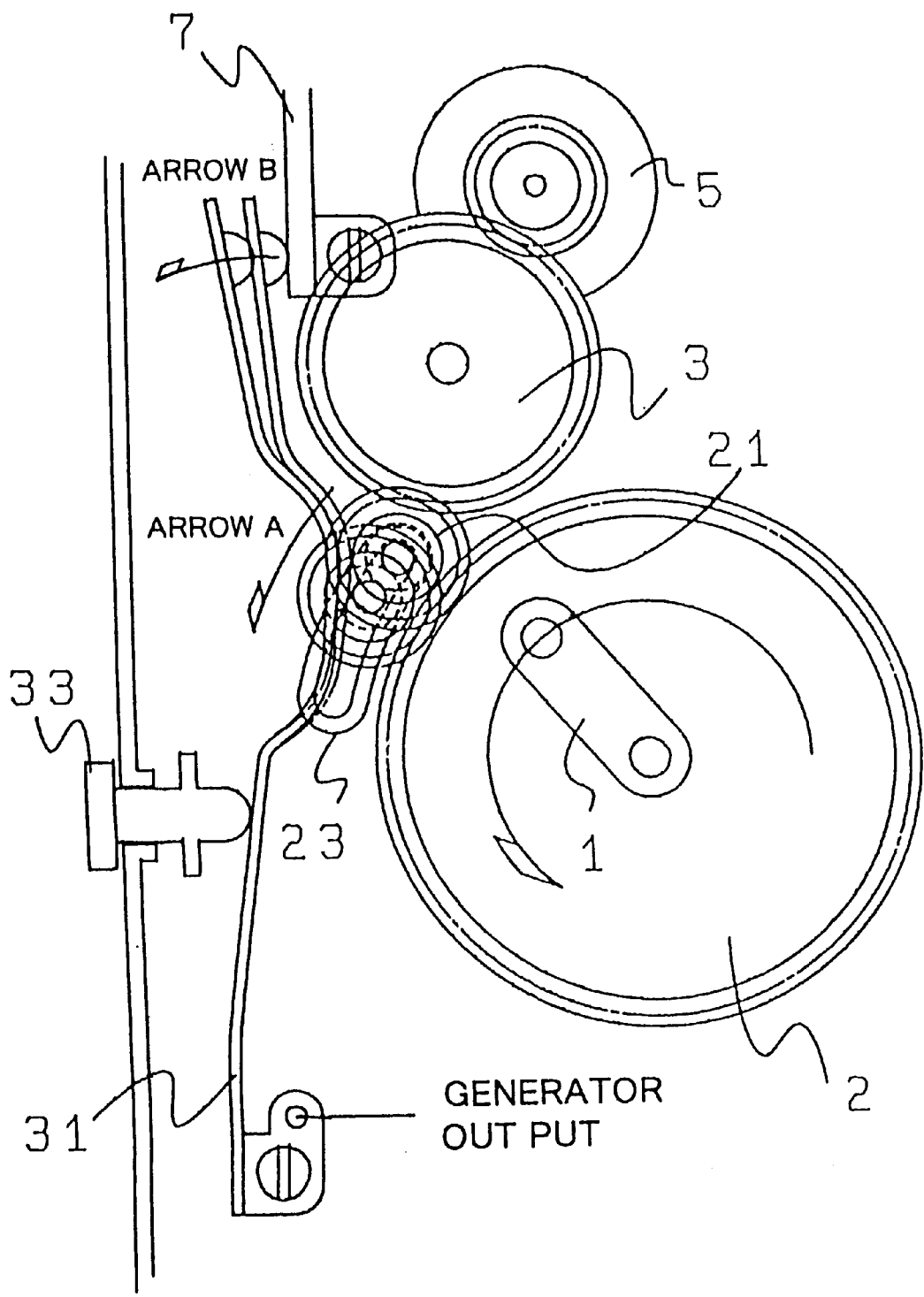
FIG. 15 is an operational view concerning the electrical connecting/disconnecting means during leftward rotation of the handle in Embodiment 4 of the present invention.

FIG. 15 is an operational view concerned with the electrical connecting/disconnecting means, showing a state that the leftward rotation of the handle brings the rocking wheel 21 out of mesh to prevent against reverse charge from the generator 5 to the secondary battery, and the minus connection 7 and the switch contact spring 31 are disconnected to prevent discharge from the secondary battery to the generator 5.

Figure 16:
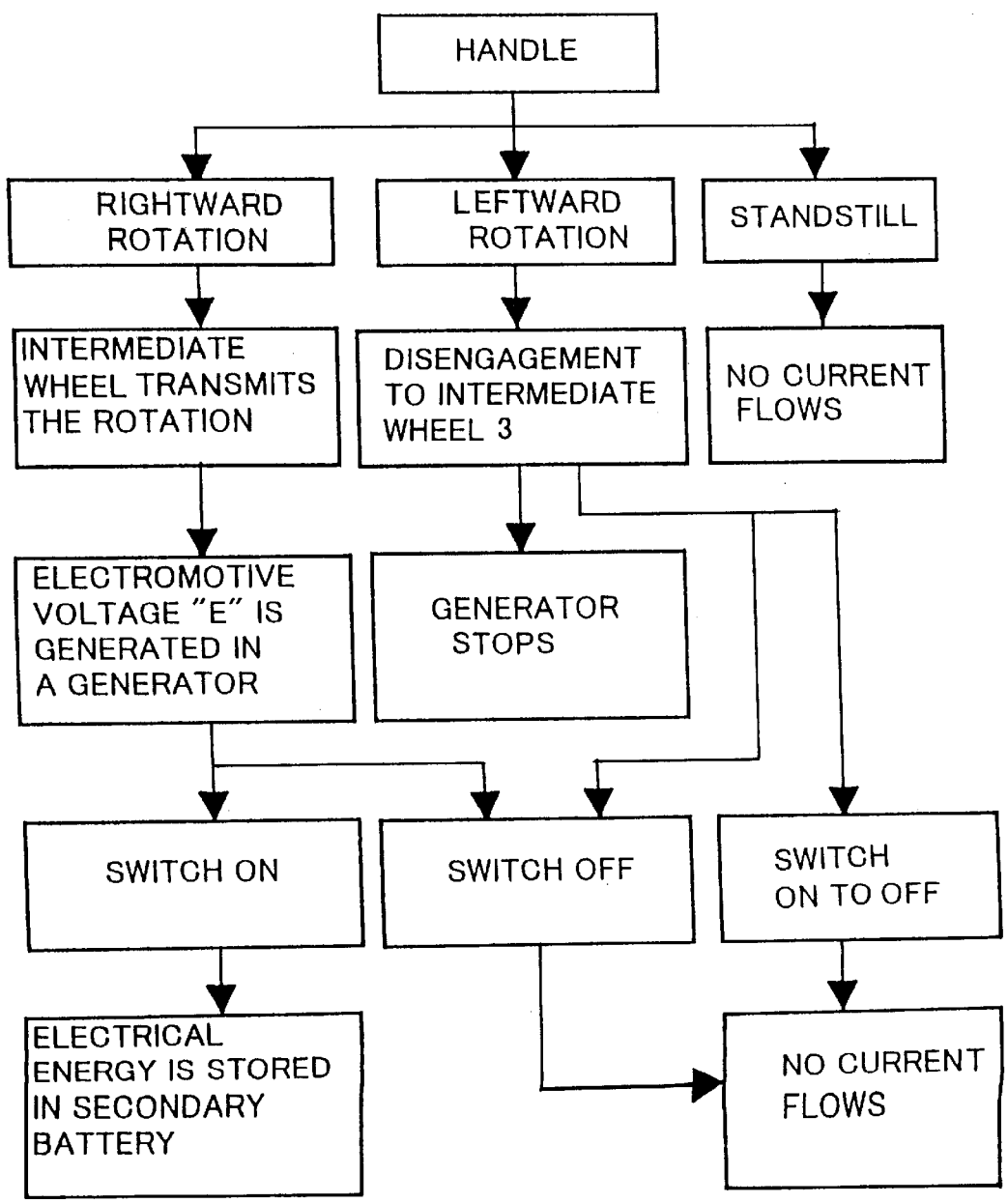
FIG. 16 is a flowchart showing a series of operations shown in FIG. 14 and FIG. 15 in Embodiment 4 of the present invention.

FIG. 16 is an operational flowchart showing a series of operations in FIG. 14 and FIG. 15.

First, explanations will be made, with using FIG. 14 and FIG. 16, on an embodiment to charge the secondary battery.

The rocking wheel is brought in a state in mesh with the rotation transmitting wheel 2 and the intermediate wheel 3 by rotating the handle rightward, causing an electromotive voltage in the generator. In this state, if the switch 33 is depressed, the switch contact spring 31 becomes in connection with the minus connection 7. Thus, electricity is charged from the generator 5 to the secondary battery.

Now, explanations will be made, using FIG. 15 and FIG. 16, on an embodiment to prevent against reverse charge from the generator 5 to the secondary battery as well as discharge from the secondary battery to the generator 5.

The rocking wheel 21 is disengaged from the intermediate wheel 3, stopping the generator. The stoppage of the generator eliminates the occurrence of a reverse electromotive voltage due to reversing in position of the handle 1. Further, the rocking wheel 21, disengaged from the intermediate wheel 3, is revolved by the rotation transmitting wheel 2 and moved in a direction of an arrow A. This forces the switch contact spring to be raised in a direction of an arrow B, thereby disconnecting the switch contact spring 31 and the minus connection 7 from each other.

Example 5

Example 5 of the present invention is characterized in that, in a mechanical engaging means 70, the position of abutment of an outer end of the handle against an outer end of a charging button are deviated in plan. A magnetic attracting force is utilized for a holding means 71 to prevent the reversed handle from being raised up.

Figure 18:
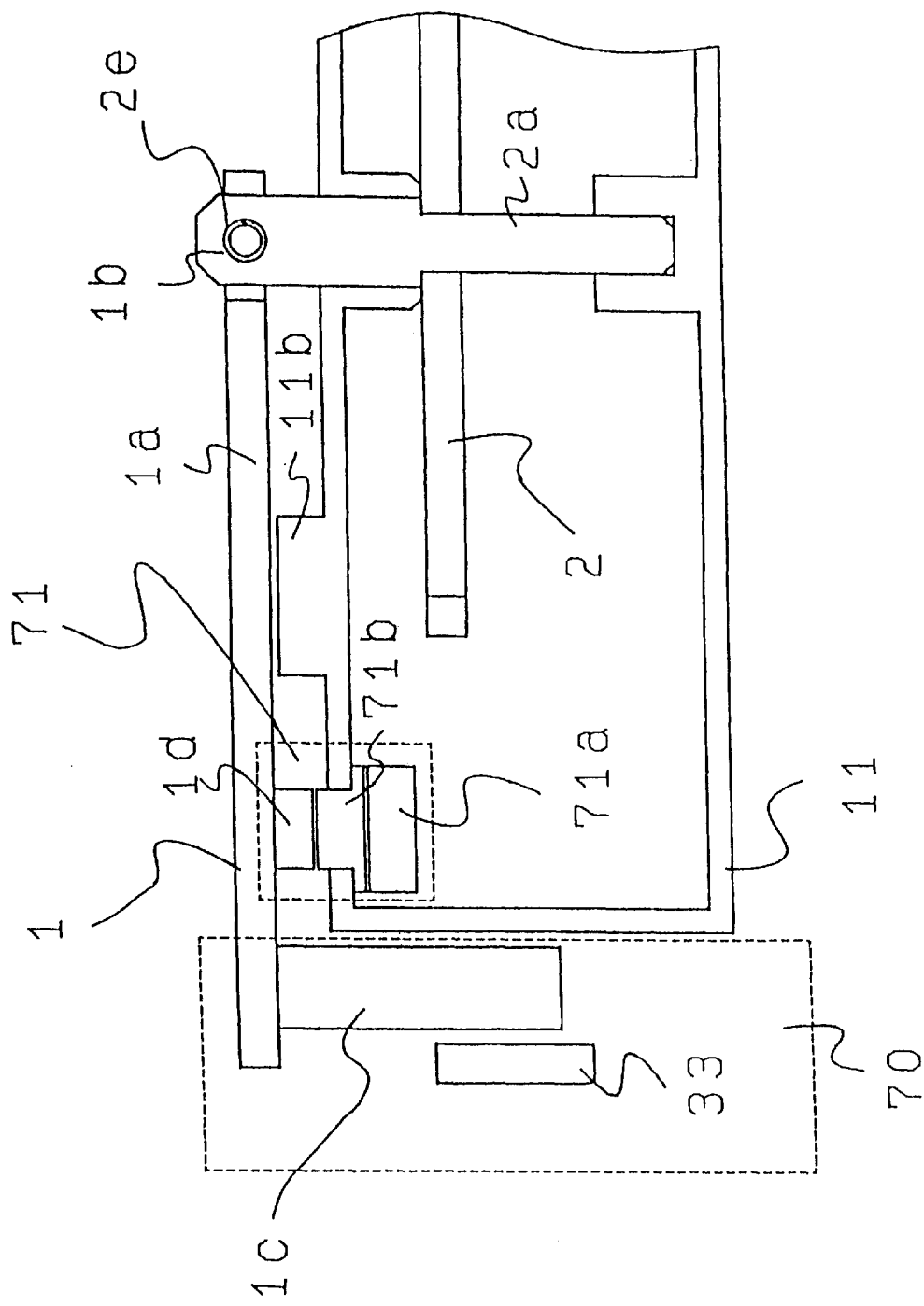
FIG. 18 is a sectional view showing a structure of a mechanical engaging means 70 and a holding means 71 in Embodiment 5 of the present invention.
Figure 19:
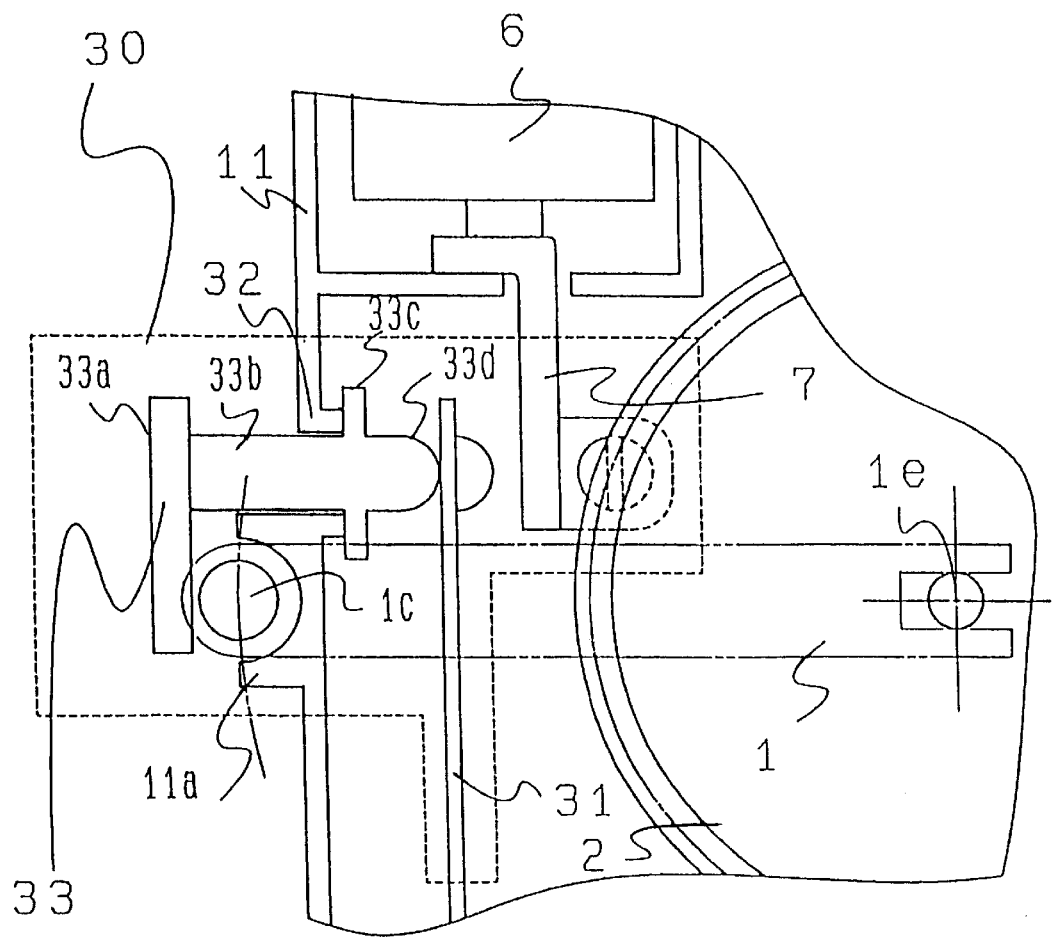
FIG. 19 is a projection plan view of FIG. 18 as viewed from the above.

FIG. 18 is a sectional view showing a structure of a mechanical engaging means 70 and a holding means 71 according to the first embodiment, while FIG. 19 is a projection plan view of FIG. 18 as viewed from the above.

First, the handle 1 is structured, as shown in FIG. 18, by an arm portion 1a, a through-hole 1b that is in a relation of clearance fit or tight fit to a rotational axis pin 2e, a convex portion 1c (hereinafter referred to as a "grip" 1c) provided at one side surface of the arm portion 1a, and a magnetic-material pin 1d fixed to the arm portion 1a. Incidentally, the magnetic material pin 1d may be received or embedded in a hole or groove formed in the arm portion 1a. Further, if the arm portion 1a itself is formed of a magnetic material, the magnetic-material pin 1d may be omitted. Also, the grip 1c provided on the handle 1 is made in such a length that abuts against at least an external flange portion 33a and has a sufficient amount of contact with the charging button 33 to ensure positive engagement, and may be made integral with or separate from the handle 1.

The handle 1 is arranged on a rotational axis 2a of the rotation transmitting wheel 2 so that it can turned over about the rotational axis pin 2e over a surface of a case 11.

Meanwhile, the charging button 33, included in the electrical connecting/disconnecting means 30, is structured as shown in FIG. 19 by an outside flange 33a, a movement-guide axis 33b, an internal flange 33c, and a contact portion 33d.

The outside flange 33a is provided in abutment against the grip 1c. The movement-guide axis 33b is provided so that the charging button 33 is axially supported and allowed to move in one direction by a charging-button guide hole 32 provided in the case 11. The internal flange 33c is provided to restrict the charging button 33 from moving outward. The contact portion 33d is in abutment against the switch contact spring 31.

The case 11 further has, as shown in FIG. 19, a handle-positioning guide 11a provided on a circumference about a rotational center 1e of the handle 1 at a location in abutment against the outside flange 33a of the charging button 33. Further, a through-hole is provided at such a location that is overlapped as viewed in plan with the magnetic-material pin 1d when the grip 1c is accommodated in the handle-positioning guide 11a. This through-hole is fitted with a magnetic-material flanged pin 71b having, at one surface, a magnetized magnet 71a joined (e.g. adhered) thereon.

The mechanical engaging means 70 and the holding means 71 are structured as above in Embodiment 1 of the present invention.

Now, explanations will be made on the operation of the mechanical engaging means 70 and the holding means, with reference to FIG. 20, FIG. 21 and FIG. 22.

Figure 20:
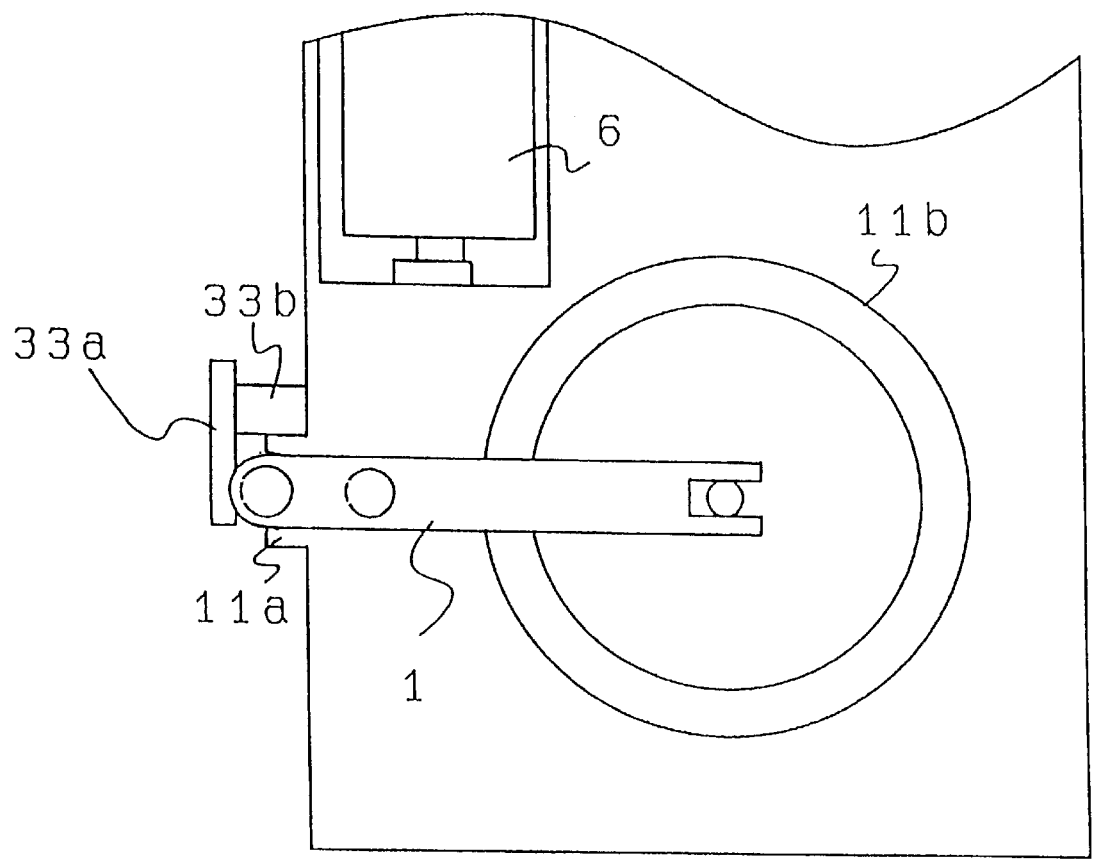
FIG. 20 is a partial assembly plan view as viewed from the above of the mechanical engaging means 70 and the holding means 71 in Embodiment 5 of the present invention.
Figure 21:
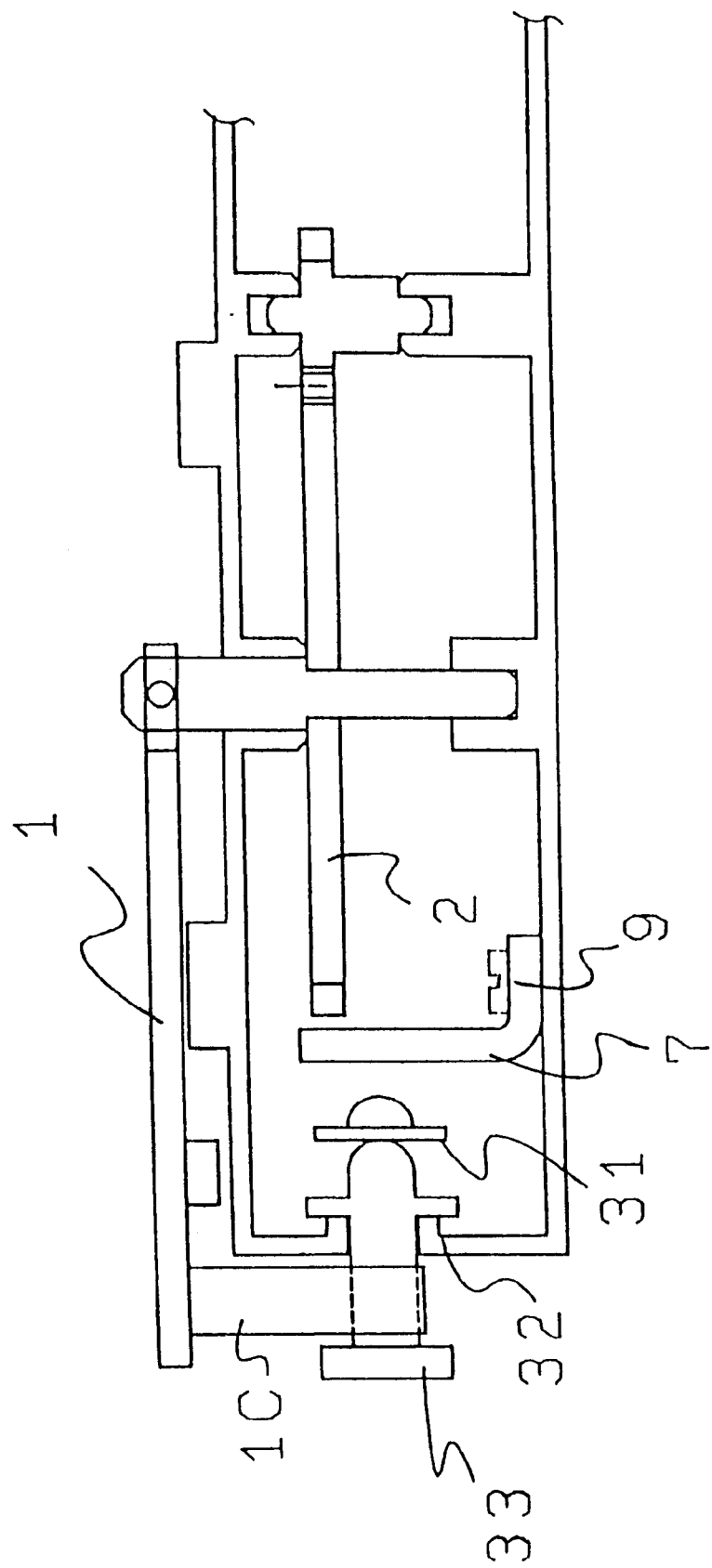
FIG. 21 is a sectional view showing a state that the handle is accommodated in Embodiment 5 of the present invention.

FIG. 20 is a partial-assembly plan view, viewed from the above, of the mechanical engaging means 70 and the holding means 71 according to one embodiment of the present invention. FIG. 21 is an explanatory view showing a state that the grip 1c of the reversed handle 1 is accommodated in a handle-positioning guide 11a so that the charging button 33 is prevented from being pushed in.

At this time, the handle 1 is in a state that is impossible to rotate as shown in FIG. 20. Further, if the charging button 33 is to be pressed in, it becomes abutting against the grip 1c of the handle 1, as shown in FIG. 21. Accordingly, there is no possibility that the switch contact spring member 31 at its end is abutted against and electrically contacted with the connection 7. Thus the switch contact spring member 31 and the connection 7 are placed in an electrically closed loop.

Figure 22:
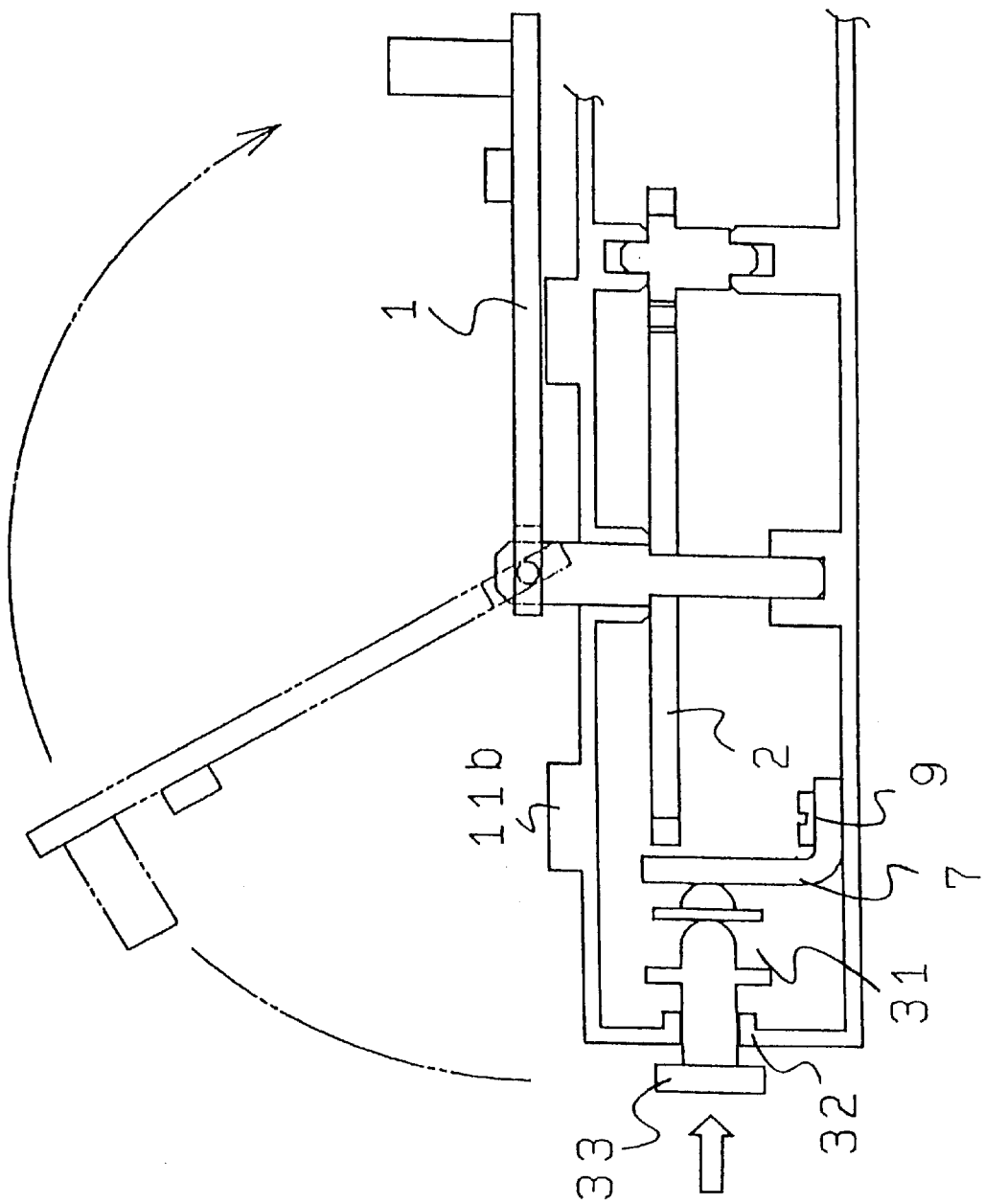
FIG. 22 is a sectional and operational view showing a state that the handle 1 is placed in a charging position.

FIG. 22, on the other hand, is an explanatory view showing a state that the handle 1 is put in a charging state, wherein the handle 1 is in a state to freely rotate along a rotational table 11b. At this time, the charging button 33, as shown in FIG. 22, can move in one direction along a charging-button guide hole 32. If the charging button 33 is depressed onto a spring arm of a switch contact spring 31, the switch contact spring member at its end becomes abutting against the connection 7, providing an electrical contact. Thus, an electrically closed loop is formed between the switch contact spring member and the connection 7. If the handle 1 is rotated to rotate the generator, the charging of electricity can be made from the generator to the secondary battery 6.

If using the mechanical engaging means 70 and the holding means 71 so far explained, the charging button is engaged by a part of the handle, the reversed-state handle is positioned in position, in plan, by a part of the case, and the reversed handle is prevented from being raised up by a magnetic force. This makes it possible to prevent the electrically connecting/disconnecting means from erroneously operated, such as by depression of the charging button, while not in charging, resulting in discharge from the secondary battery to the generator.

Embodiment 6

Embodiment 6 of the present invention is concerned with another example of the holding means of the present invention. FIG. 23 is a view showing a state that the handle 1 is reversed in position so that the grip 1c is engaged with the charging button 33, wherein (a) is a plan view, (b) is a sectional view on A–A' shown in FIG. 23(a), and (c) is a sectional view on B–B'. This embodiment is characterized, in a means 72 (mechanical holding means 72) for mechanically engaging the handle 1 at a predetermined position, by utilizing convex and concave portions respectively provided, as a means to prevent the reversed-handle from being raised-up, in the handle 1 and the rotation transmitting wheel 2.

First, explanations will be made on the handle 1 and the rotation transmitting wheel 2 in Embodiment 6 of the present invention.

As shown in FIGS. 23(a) and (c), the handle 1 of Embodiment 2 is provided with a penetrating groove 1g to give springiness to the convex portions at the respective sides of the arm portion 1a and a spring portion 1h, in place of using the magnetic-material pin, so that the portion 1f can be elastically deformed.

Also, the rotation transmitting wheel 2 is characterized in that it is provided with an accommodation groove 2c formed wider than the width of the arm portion 1a of the handle 1 at an upper portion of the gear 2b, and (two) recessed portions at locations respectively overlapped, in section and plan, with the convex portion 1f on the arm portion 1a. There is no limitation in structure or axis-supporting way of the rotational axis, provided that the handle 1 can be reversely turned by 180 degrees about the rotational-axis pin 2e. Further, although in FIG. 23(b) an axis-supporting structure, having a guide hole formed on the rotational axis and a rotational axis 11c projected from the case, is employed as a rotational-axis supporting way for the rotation transmitting wheel 2, the invention is not limited to this structure provided that the rotation transmitting wheel 2 is provided rotatable.

A mechanically holding means 72 for preventing the handle 1 lifting-up is structured to place the handle 1 in engagement, by receiving the convex portions 1f provided at the both sides of the arm portion 1a in concave portions 2d provided in the transmitting wheel 2, as shown in FIG. 23(c). When the handle 1 is accommodated in the handle accommodating groove 2c, if setting is made by utilizing the springiness of the portion 1h to a degree that disengagement is possible, there is no possibility that the handle 1 is unnecessarily raised up. Incidentally, the grip 1c engages with the movement of the charging button 33, similarly to Embodiment 5.

On the other hand, if the spring portion 1h is given springiness, the convex portion 1f is prevented from being cut encountered upon disengaging the convex portion 1f from the concave portion 2d.

In this manner, the mechanically holding means 72 is structured, as a holding means to prevent the reversed handle from being raised up, to mechanically engage the handle 1 in a predetermined position by utilizing the convex and concave portions provided respectively in the handle 1 and the rotation transmitting wheel 2.

Embodiment 7

Figure 24A:
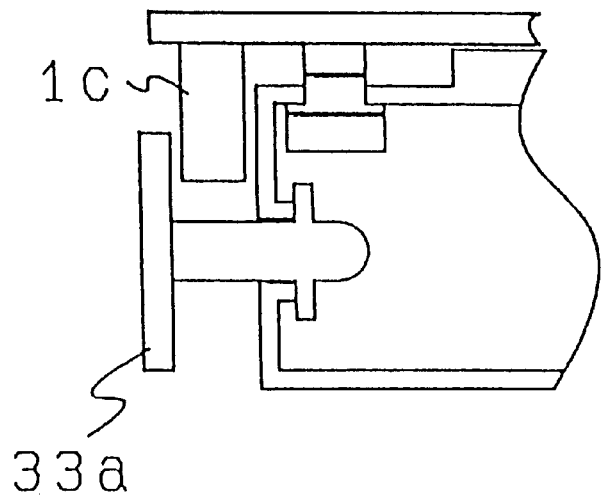
FIG. 24 is a view showing a mechanical engaging means in Embodiment 7 of the present invention, wherein (a) is a sectional view, and (b) is a side view as viewed from the side of the charging button 33 in (a)
Figure 24B:
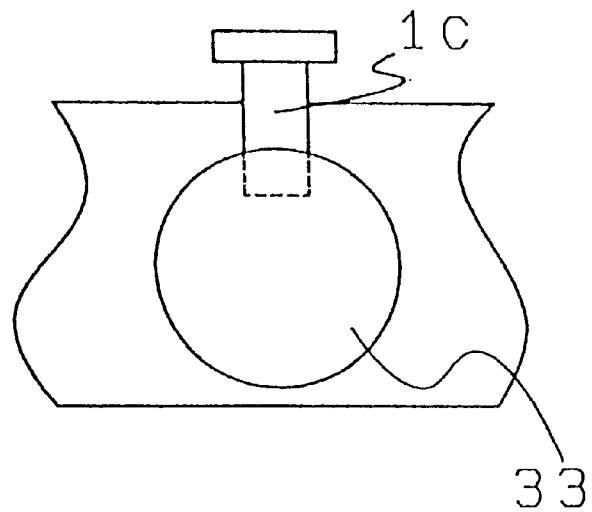

FIG. 24 shows another embodiment 7 of the mechanically engaging means of the present invention. FIG. 24(a) is a sectional view and (b) is a side view as viewed from a side of the charging button 33, showing that the grip 1c is arranged above the charging button 33 so as to engage with the charge button 33.

Embodiment 7 shows that, even if the position of abutment of the charging button 33 against the grip 1c is altered, no importance is placed on the abutment position provided that the grip 1c can serve to engage with the movement of the charging button 33.

Embodiment 8

Embodiment 8 of the present invention is characterized in that a handle accommodating portion 1d is provided in the case to accommodate the handle and further a discharge preventing means 80 is provided to shield an electrical loop between the generator and the secondary battery during accommodating the handle.

Figure 25:
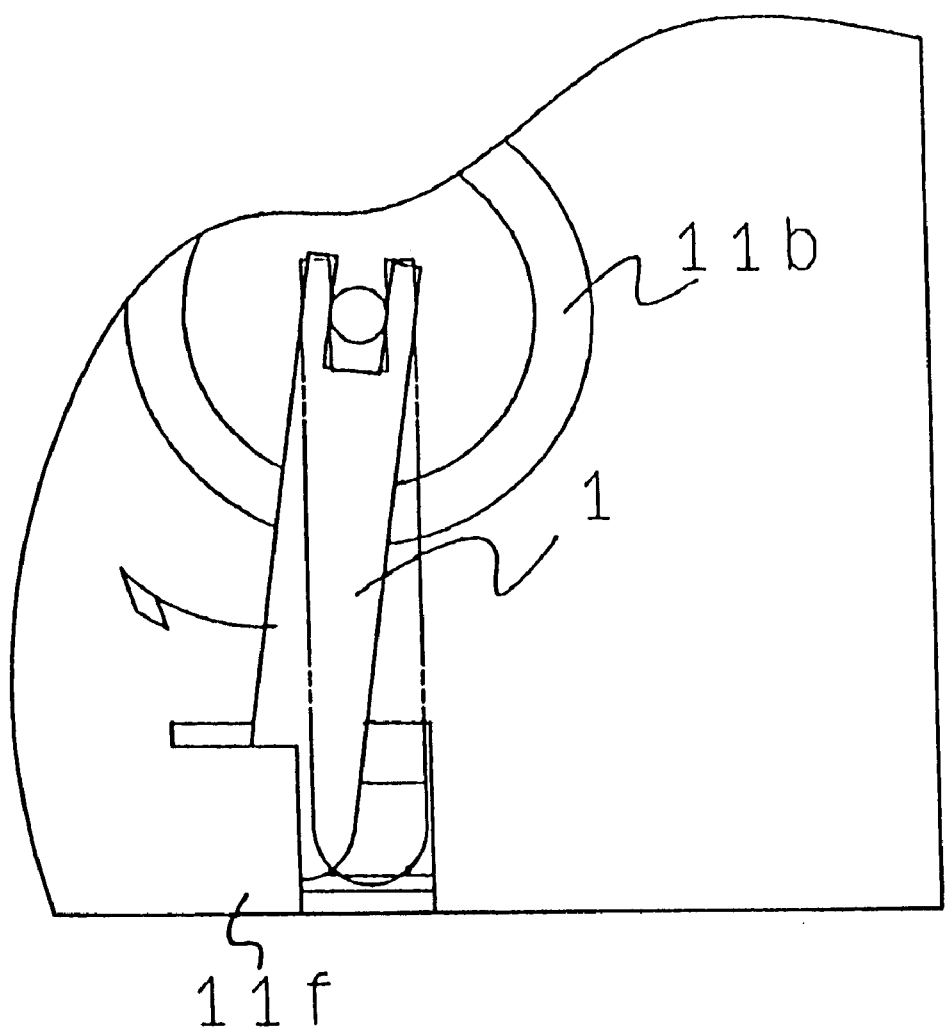
FIG. 25 is a plan view showing that the handle is accommodated in a handle accommodating portion in Embodiment 8 of the present invention.
Figure 26A:
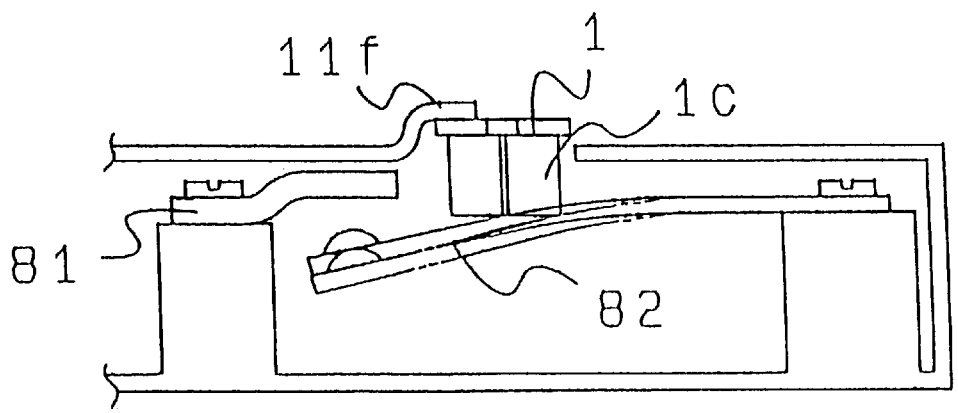
FIG. 26 is a view showing an electrical connecting/disconnecting means and a handle accommodating portion in Embodiment 8 of the present invention, wherein (a) is a sectional view in handle accommodation, and (b) s a sectional view the handle is out of the accommodating portion.
Figure 26B:
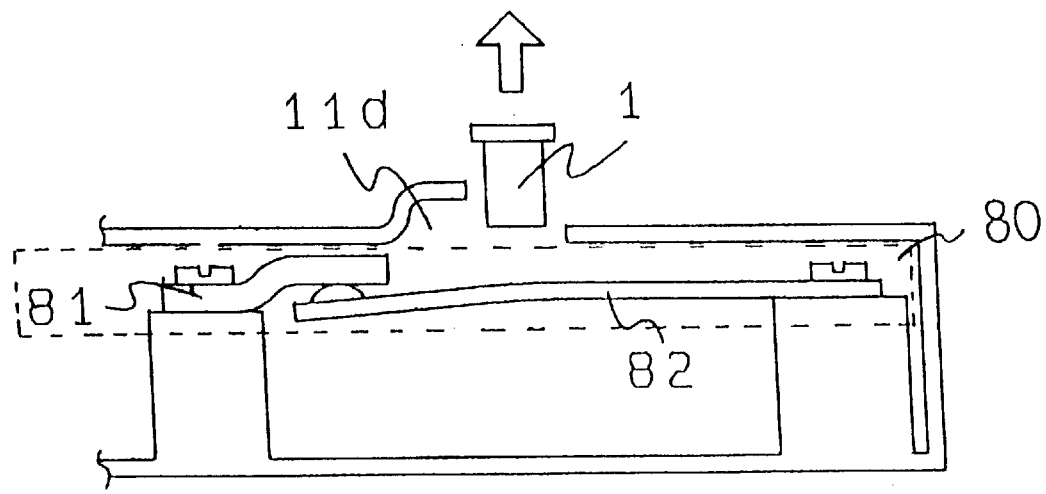

FIG. 25 is a plan view showing that the handle 1 is accommodated in the handle accommodating portion. FIG. 26(a) is a sectional view showing when the handle is accommodated, while (b) is a sectional view showing that the handle is out of the handle accommodating portion.

First, the handle accommodating portion 11d is structured, as shown in FIG. 26(a), by a penetrating portion 11e formed at a part of a case upper surface, and a handle-holding flange 11f formed by raising part of the case so that the handle and the case are overlapped in section with when the handle 1 is accommodated.

As shown in FIG. 26(a), when the handle 1 is accommodated in the handle accommodating portion 11d, the handle grip 1c at one end becomes abutting against an elastic member 82. Further, if the handle is rotated in a direction of an arrow as shown in FIG. 26(a), the handle at its top end becomes abutting, in section, against the handle-holding flange 11f provided in the case. At this time, the electrical contact 81 and the metal-material elastic member 82 are electrically disconnected therebetween. Accordingly, the discharge preventing means 80 provided in the electrical loop having the generator and the secondary battery is in an open state.

On the other hand, when the handle 1 is out of the handle accommodating portion 11d, the electrical contact portion 81 and the elastic member 82 are in contact and hence electrical connection with. Therefore, the discharge preventing means 80 provided in the electrical loop having the generator and the secondary battery is in a short-circuit state.

Figure 27:
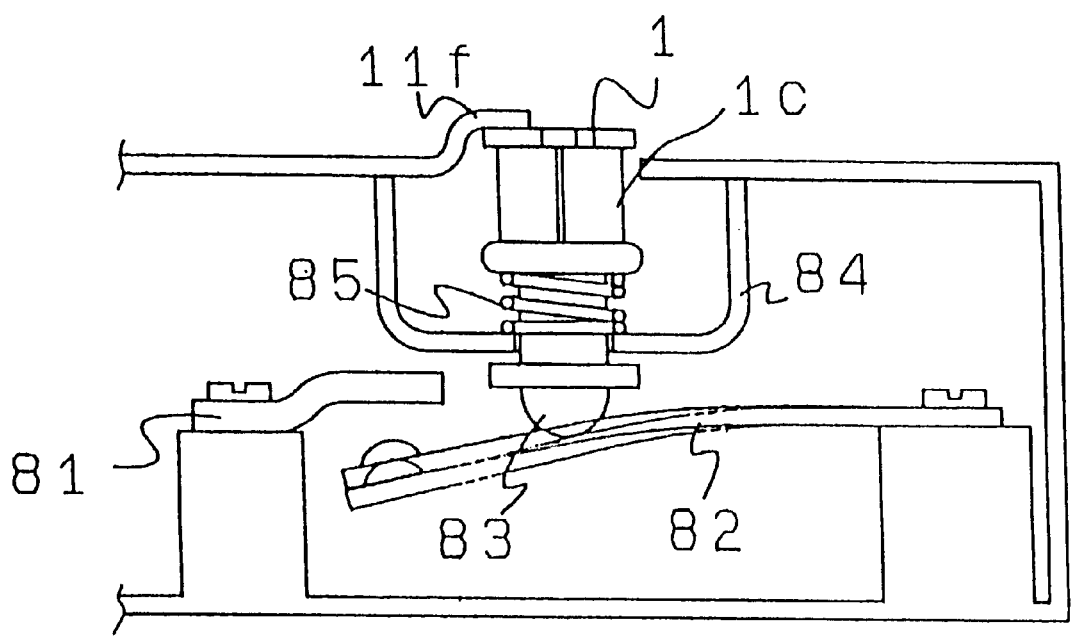
FIG. 27 is a sectional view showing another embodiment in Embodiment 8 of the present invention.

Incidentally, in the present embodiment the handle grip is directly abutted against the elastic member. However, as shown in FIG. 27, it is possible to internally cover the handle accommodating portion 11d with a dust-preventive cover 84, further forming a through-hole at a location that the grip and the elastic member are overlapped with, attaching a switch member 83 movable by a predetermined moving amount and a spring member 85 to the dust-preventive cover 84, wherein, during handle accommodation, the switch member 83 is moved by the grip 1c to be abutted against the elastic member 82 to deform the elastic member 82.

INDUSTRIAL APPLICABILITY

The effects of the present invention will be given below.

Figure 17:
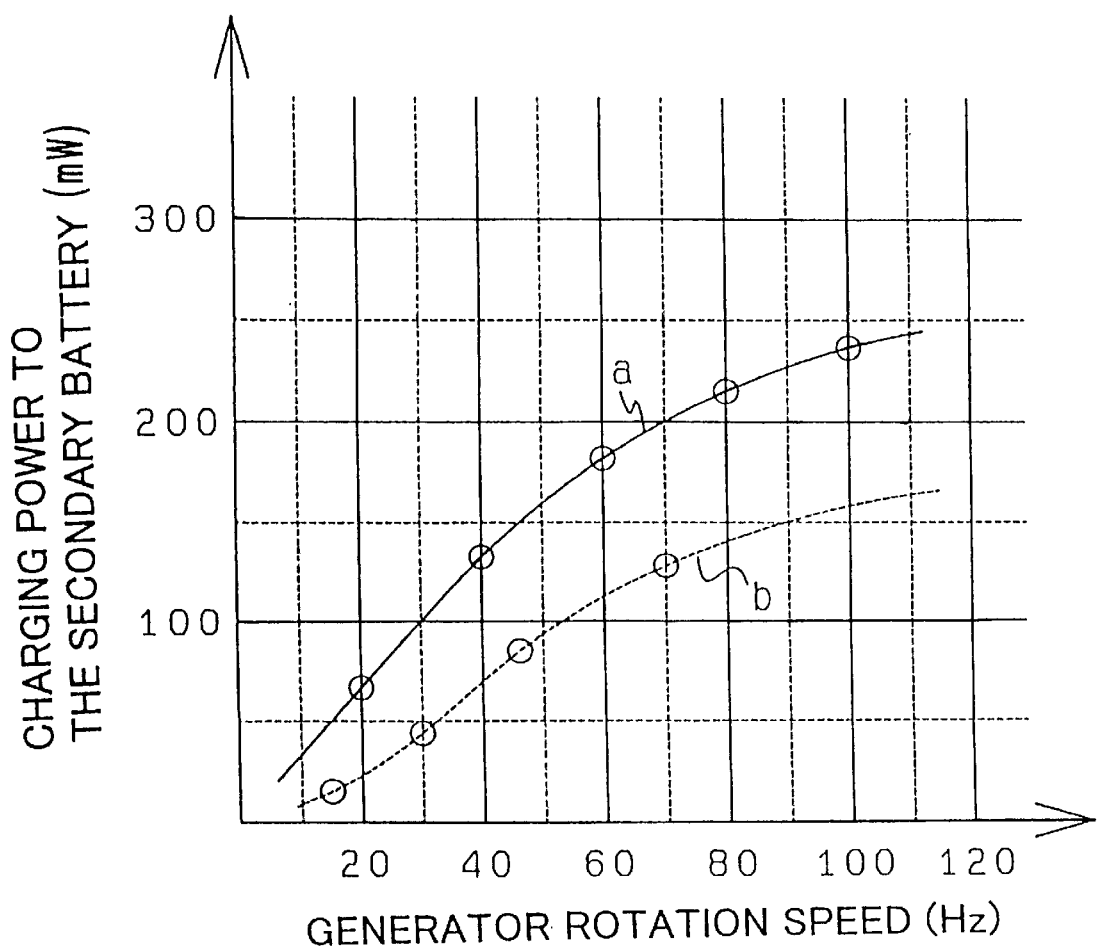
FIG. 17 is a graph showing a characteristic of the battery charger.

(1) This invention increases the charging efficiency as shown in FIG. 17 due to the provision of the one-way rotary clutch and the electrical connecting/disconnecting means in the small-sized battery charger, as explained above.

FIG. 17 is a graph demonstrating a characteristic of the battery charger, wherein the electric power charged to the secondary battery is shown with respect to the number of rotations of the generator. In the figure, the solid line a denotes the characteristic of the battery charger of the present invention, while the dotted line represents the characteristic of a conventional battery charger using diodes.

In the conventional battery charger to charge through the diode, the charging efficiency is lowered by the amount of a voltage drop, as shown in FIG. 17. The battery charger of the present invention, on the other hand, is free of voltage drops as caused by a diode, thus realizing an efficient battery charger.

(2) The use of the one-way rotary clutch plays a role alike an indicator representative of the presence and absence in the charging state, because the loading torque acting on the handle differs depending on the rotating direction of the handle 1.

(3) Since the electrical function is achieved, similarly to that of diodes, by the structure with the reduced number of components, the cost is inexpensive as compared to the case of adding a multiplicity of diodes in parallel.

(4) There are provided a mechanical engaging means to engage at a part of the handle with the charging button and position, in plan, the reversed handle in position by a part of the case, and a holding means to prevent the mechanically or magnetically reversed handle from being raised up. This makes it possible to prevent the electrical connecting/disconnecting means from erroneously operated as problematically encountered by a small-sized battery charger due to depression of a charging button 33 during not in charging to cause discharge from a secondary battery to a generator.

(5) The adoption of a simple structure to engage the handle at its part with the charging button eliminates the necessity of using a separate component for engaging with the charging button.

(6) The handle is positively prevented from moving out of a predetermined position, regardless of the charging button, during being carried by, making it possible to prevent the electrical connecting/disconnecting means from being erroneously operated, such as discharging from the secondary battery to the generator.

What is claimed is:

1. A small-sized battery charger, comprising:

an external rotary operating member (1) arranged rotatable;

a generator (5) for converting a rotational kinetic energy of said external rotary operating member (1) into an electrical energy having a non-invertable electric polarity depending upon rotation;

a one-way rotary clutch (20) for short-circuiting an energy transmitting path for transmitting a rotational kinetic energy of said external rotational operating member (1) to said generator (5) depending upon a rotational direction of said external rotational operating member (1);

an electricity storing means (6) for storing the converted electrical energy; and an electrical connecting/disconnecting means (30) for connecting between said generator (5) and said electricity storing means (6) to form an electrical loop when said generator (5) is in a power generating state.

2. A small-sized battery charger according to claim 1, wherein said external operating member (1) is arranged for being reversed in position over a surface of a case (11), and said electrical connecting/disconnecting means (30) being engaged at an outer end thereof to provide a mechanically engaging means (70) at a side surface of said case, preventing erroneous operation of said electrical connecting/disconnecting means (30).

3. A small-sized battery charger according to claim 1, wherein said external operating member (1) has at an outer end a recess (10) engaged with a flange (33a) provided at an outer end of said electrical connecting/disconnecting means (30) and a handle positioning guide portion (11a) provided in said case (11).

4. A small-sized battery charger according to claim 3, wherein a holding means (71) is provided to prevent said external operating member (1) from rising up when said external operating member (1) is reversed in position and engaged with the outer end of said electrical connecting/disconnecting means (30).

5. A small-sized battery charger according to claim 1, wherein provided are a discharge preventing means (80) formed by an electrically-conductive elastic member (82) and an electric contact member (81) in the electrical loop between said generator (5) and said electricity storing means (6), an accommodating portion (11b) for said external operating member (1) provided at a part of a case (11), wherein, when said external operating member (1) is accommodated in said accommodating portion (11b), a part of said external operating member (1) or a part of a switch member moving in contact with said external operating member (1) is abutted against said elastic member (82) to deform said elastic member (82), thereby shielding in electrical connection of said elastic member (82) from said electrically connecting/disconnecting member (81).

* * * * *